United States Patent
Mizuguchi et al.

(10) Patent No.: US 10,726,215 B2
(45) Date of Patent: Jul. 28, 2020

(54) ARTICLE IDENTIFICATION APPARATUS, ARTICLE IDENTIFICATION METHOD, PROGRAM, SERVER, AND ARTICLE IDENTIFICATION SYSTEM

(71) Applicants: NEC CORPORATION, Tokyo (JP); NEC PLATFORMS, LTD., Tokyo (JP)

(72) Inventors: Hisayuki Mizuguchi, Tokyo (JP); Takeshi Yamakage, Tokyo (JP); Hideo Yokoi, Kanagawa (JP); Katsuhito Okamura, Tokyo (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 16/062,252

(22) PCT Filed: Dec. 27, 2016

(86) PCT No.: PCT/JP2016/088836
§ 371 (c)(1),
(2) Date: Jun. 14, 2018

(87) PCT Pub. No.: WO2017/115777
PCT Pub. Date: Jul. 6, 2017

(65) Prior Publication Data
US 2019/0005281 A1    Jan. 3, 2019

(30) Foreign Application Priority Data

Dec. 28, 2015 (JP) .................. 2015-256422

(51) Int. Cl.
*G06K 7/10* (2006.01)
*G06Q 30/06* (2012.01)
(Continued)

(52) U.S. Cl.
CPC ............. *G06K 7/10* (2013.01); *G06Q 20/202* (2013.01); *G06Q 20/208* (2013.01); *G06Q 30/06* (2013.01);
(Continued)

(58) Field of Classification Search
CPC .......... G06K 7/10; G06Q 30/06; G06Q 50/00; G06T 7/00; G06T 7/0004; G07G 1/00; G07G 1/0009; G07G 1/0045
See application file for complete search history.

(56) References Cited

U.S. PATENT DOCUMENTS

2005/0231370 A1* 10/2005 Tagato ................. G06Q 10/087
340/572.1
2012/0284105 A1* 11/2012 Li .......................... G06Q 30/02
705/14.23
(Continued)

FOREIGN PATENT DOCUMENTS

| CN | 1637757 A | 7/2005 |
|---|---|---|
| CN | 102254199 A | 11/2011 |

(Continued)

OTHER PUBLICATIONS

International Search Report for PCT/JP2016/088836 dated Feb. 7, 2017 [PCT/ISA/210].
(Continued)

*Primary Examiner* — Thien M Le
(74) *Attorney, Agent, or Firm* — Sughrue Mion, PLLC

(57) ABSTRACT

An article identification apparatus (10) includes an article identification information acquisition unit (110) that acquires article identification information of an article, an image acquisition unit (120) that acquires an image of an attached object attached to the article, a group identification information acquisition unit (130) that acquires group identification information for identifying a group to which the
(Continued)

article belongs by processing the image, and an article information acquisition unit (140) that acquires article information corresponding to a combination of the acquired group identification information and the acquired article identification information.

13 Claims, 18 Drawing Sheets

(51) Int. Cl.
*G06Q 50/00* (2012.01)
*G06Q 20/20* (2012.01)
*G07G 1/00* (2006.01)
*G06T 7/00* (2017.01)

(52) U.S. Cl.
CPC ........... *G06Q 50/00* (2013.01); *G06T 7/0004* (2013.01); *G07G 1/0009* (2013.01); *G07G 1/0036* (2013.01); *G07G 1/0045* (2013.01)

(56) References Cited

U.S. PATENT DOCUMENTS

| 2015/0003729 | A1* | 1/2015 | Hayashi | G06K 9/6201 |
| | | | | 382/165 |
| 2017/0344972 | A1* | 11/2017 | Sasaki | G06K 9/6215 |

FOREIGN PATENT DOCUMENTS

| JP | 2001-243364 A | 9/2001 |
| JP | 2012-014220 A | 1/2012 |
| JP | 2014-071681 A | 4/2014 |

OTHER PUBLICATIONS

Search Report dated Apr. 23, 2020, issued by the China National Intellectual Property Administration in Chinese Application No. 201680077457X.

* cited by examiner

| INFORMATION ALLOWING ARTICLE IDENTIFICATION INFORMATION TO BE ACQUIRED | RELATIVE POSITION INFORMATION TO REFERENCE POINT (34) |
|---|---|
| CODE SYMBOL (32) | $\{(x_{AI1}, y_{A1}), \cdots\}$ |
| ⋮ | ⋮ |

FIG. 5

| GROUP IDENTIFICATION INFORMATION | IMAGE FEATURE VALUE |
|---|---|
| AAA | xxxyyyzzz |
| BBB | aaabbbccc |
| ⋮ | ⋮ |

| SPECIFIC DESIGN | RELATIVE POSITION INFORMATION TO REFERENCE POINT (34) |
|---|---|
| SPECIFIC DESIGN (36) | $\{(x_{D1}, y_{D1}), \cdots\}$ |
| ⋮ | ⋮ |

FIG. 7

| GROUP IDENTIFICATION INFORMATION | ARTICLE IDENTIFICATION INFORMATION | ARTICLE INFORMATION | | |
|---|---|---|---|---|
| | | ARTICLE NAME | PRICE | ... |
| AAA | 00001 | xxxx | 1,000 | ... |
| AAA | 00002 | yyyy | 1,500 | ... |
| BBB | 00001 | zzzz | 2,000 | ... |
| ⋮ | ⋮ | ⋮ | ⋮ | ⋮ |

FIG. 8A (A) GROUP IDENTIFICATION INFORMATION: AAA

| ARTICLE IDENTIFICATION INFORMATION | ARTICLE INFORMATION | | |
|---|---|---|---|
| | ARTICLE NAME | PRICE | ... |
| 00001 | xxxx | 1,000 | ... |
| 00002 | yyyy | 1,500 | ... |
| ⋮ | ⋮ | ⋮ | ⋮ |

FIG. 8B (B) GROUP IDENTIFICATION INFORMATION: BBB

| ARTICLE IDENTIFICATION INFORMATION | ARTICLE INFORMATION | | |
|---|---|---|---|
| | ARTICLE NAME | PRICE | ... |
| 00001 | zzzz | 2,000 | ... |
| ⋮ | ⋮ | ⋮ | ⋮ |

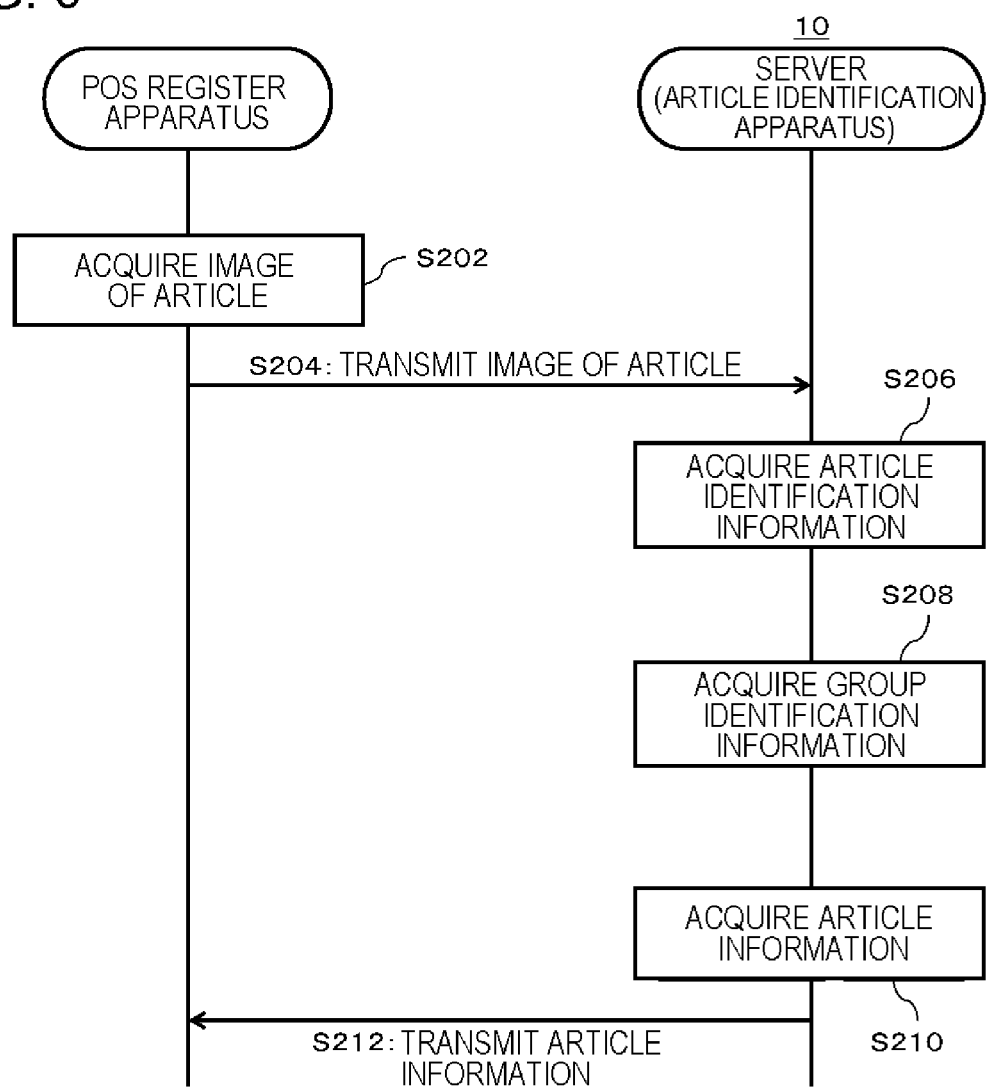

FIG. 12

| GROUP IDENTIFICATION INFORMATION | ARTICLE INFORMATION ||||||
|---|---|---|---|---|---|---|
| | ARTICLE IDENTIFI-CATION INFORMATION | ARTICLE NAME | PRICE | OUTER FEATURE INFORMATION | | |
| AAA | 00001 | xxxx | 1,000 | ELLIPTICAL, BLUE, STRIPED PATTERN | ⋮ |
| AAA | 00002 | yyyy | 1,500 | RECTANGULAR, BLACK, DOTTED PATTERN | ⋮ |
| BBB | 00001 | zzzz | 2,000 | ELLIPTICAL, RED, NO PATTERN | ⋮ |
| ⋯ | ⋯ | ⋯ | ⋯ | ⋯ | ⋯ |

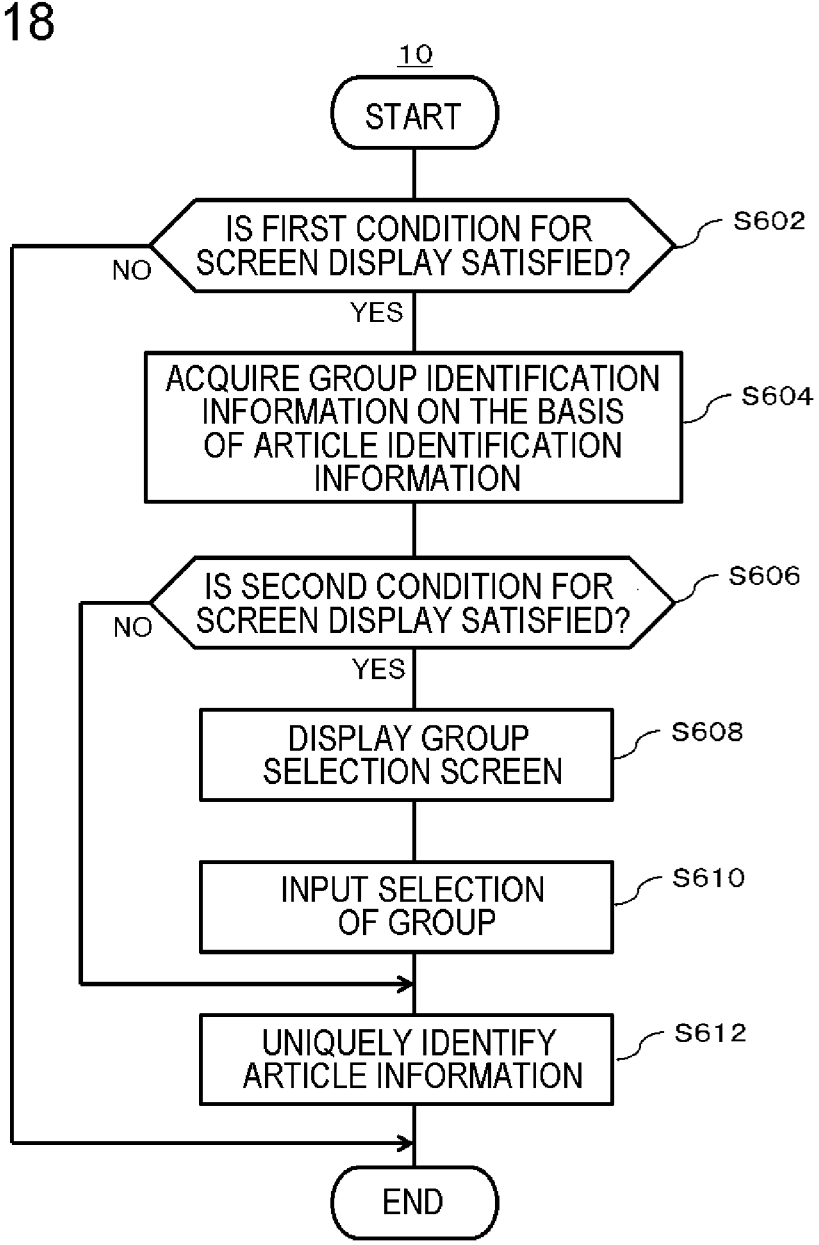

ARTICLE IDENTIFICATION APPARATUS, ARTICLE IDENTIFICATION METHOD, PROGRAM, SERVER, AND ARTICLE IDENTIFICATION SYSTEM

CROSS REFERENCE TO RELATED APPLICATIONS

This application is a National Stage of International Application No. PCT/JP2016/088836 filed Dec. 27, 2016, claiming priority based on Japanese Patent Application No. 2015-256422 filed Dec. 28, 2015, the entire contents of which are incorporated herein by reference.

TECHNICAL FIELD

The present invention relates to a technique for uniquely identifying an article.

BACKGROUND ART

Patent Document 1 discloses a technique in which identification information of a product is transmitted in association with information for specifying a database which is acquired on the basis of a feature of a tag attached to the product or design data such as a logo included in the tag, and the product is uniquely identified by the associated information.

RELATED DOCUMENT

Patent Document

[Patent Document 1] Japanese Patent Application Publication No. 2014-71681

SUMMARY OF THE INVENTION

Technical Problem

In recent years, in large shopping malls and the like, there are cases where plural stores having the same parent company and different business categories (brands and/or trade names) are consolidated and opened as one store. Even in inspection and stocktaking, products of plural business categories may be managed collectively. In a distribution stage, there is a case where articles of plural companies having different parent companies are mixed with each other. Here, in a case where information for identifying a handled article is set independently on a company basis or a business category basis, there may be a situation in which plural articles having the same identification information are present in the same location. In this case, there is a problem in which an article cannot be identified by information which is set to originally identify the article.

An object of the present invention is to provide a technique of accurately identifying an article.

Solution to Problem

According to the present invention, there is provided an article identification apparatus including an article identification information acquisition unit that acquires article identification information of an article; an image acquisition unit that acquires an image of an attached object attached to the article; a group identification information acquisition unit that acquires group identification information for identifying a group to which the article belongs by processing the image; and an article information acquisition unit that acquires article information corresponding to a combination of the acquired group identification information and the acquired article identification information.

According to the present invention, there is provided an article identification apparatus including an article information acquisition unit that acquires article identification information of an article; an image acquisition unit that acquires an image of at least a part of the article; an article feature information acquisition unit that acquires article feature information indicating an outer feature of the article by processing the image; and an article information acquisition unit that acquires article information corresponding to a combination of the acquired article feature information and article identification information of the article.

According to the present invention, there is provided an article identification apparatus including an article identification information acquisition unit that acquires article identification information of an article; an image acquisition unit that acquires an image of an attached object attached to the article or an image of at least a part of the article; an output unit that outputs the acquired image and the acquired article identification information in association with each other to a server performing an article identification process; and a reception unit that receives a process result of the server based on a combination of the acquired image and the acquired article identification information.

According to the present invention, there is provided an article identification method executed by a computer, the method including acquiring article identification information of an article; acquiring an image of an attached object attached to the article; acquiring group identification information for identifying a group to which the article belongs by processing the image; and acquiring article information corresponding to a combination of the acquired group identification information and the acquired article identification information.

According to the present invention, there is provided a program causing a computer to function as an article identification information acquisition unit that acquires article identification information of an article; an image acquisition unit that acquires an image of an attached object attached to the article; a group identification information acquisition unit that acquires group identification information for identifying a group to which the article belongs by processing the image; and an article information acquisition unit that acquires article information corresponding to a combination of the acquired group identification information and the acquired article identification information.

According to the present invention, there is provided a server including a reception unit that receives article identification information of an article, and an image of an attached object attached to the article or an image of at least a part of the article from an external apparatus; an acquisition unit that acquires group identification information for identifying a group to which the article belongs or article feature information indicating an outer feature of the article by processing the received image; an article information acquisition unit that acquires article information corresponding to a combination of the received article identification information and the acquired group identification information or the acquired article feature information; and a transmission unit that transmits the acquired article information to the external apparatus.

According to the present invention, there is provided an article identification system including a client terminal; and a server that performs an article identification process, in which the client terminal includes an article identification information acquisition unit that acquires article identification information of an article, an image acquisition unit that acquires an image of an attached object attached to the article or an image of at least a part of the article, an output unit that outputs the acquired image and the acquired article identification information in association with each other to the server, and a reception unit that receives a process result of the server based on a combination of the acquired image and the acquired article identification information, and in which the server includes a reception unit that receives article identification information and an image of an attached object attached to the article or an image of at least a part of the article, transmitted from the client terminal, a group identification information acquisition unit that acquires group identification information for identifying a group to which the article belongs or article feature information indicating an outer feature of the article by processing the received image, an article information acquisition unit that acquires article information corresponding to a combination of the received article identification information and the acquired group identification information or the acquired article feature information, and a transmission unit that transmits the acquired article information to the client terminal.

Advantages of the Invention

According to the present invention, it is possible to identify a right article even if there are plural articles corresponding to information for identifying an article.

The above-described object, and other objects, features and advantages will become more apparent on the basis of preferred embodiments described below and the following accompanying drawings.

BRIEF DESCRIPTION OF THE DRAWINGS

FIG. 5 is a diagram illustrating an example of a storage unit which stores group identification information of each group in association with a feature value which is obtained from an image and may indicate a specific group.

FIG. 7 is a diagram illustrating an example of a storage unit which manages article information of each article in association with article identification information and group identification information.

FIGS. 8A and 8B are diagrams illustrating another example of information for managing article information of each article in association with article identification information and group identification information.

FIG. 9 is a sequence diagram illustrating a flow of a process in a second operation example of the first example embodiment.

FIG. 12 is a diagram illustrating an example of a storage unit which manages article information including outer feature information of each article in association with article identification information.

FIG. 18 is a flowchart illustrating a flow of a process in the article identification apparatus of the fourth example embodiment.

DESCRIPTION OF EMBODIMENTS

Figure 1:
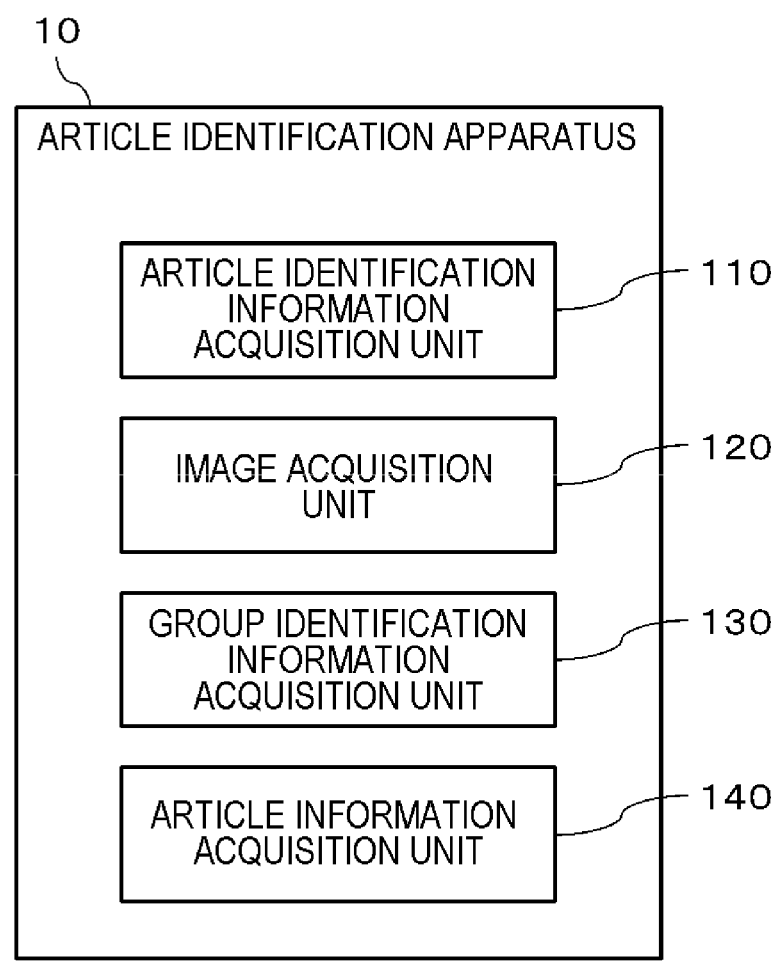
FIG. 1 is a conceptual diagram illustrating a functional configuration of an article identification apparatus according to a first example embodiment.

An article identification apparatus according to the present invention is an apparatus used in various cases where an article is required to be identified, such as purchase and checkout of an article, inspection of an article, stocktaking of an article, and transportation of an article. In the following respective example embodiments, with reference to the drawings, a description will be made of an article identification apparatus according to the present invention, an article identification method executed by a computer which functions as the article identification apparatus, and a program which causes the computer to function as the article identification apparatus according to the present invention. The same constituent element is given the same reference numeral throughout the drawings, and a description thereof will not be repeated. In each block diagram other than a hardware configuration diagram, each block represents a configuration in the function unit instead of a configuration in the hardware unit.

First Example Embodiment

[Functional Configuration]

FIG. 1 is a conceptual diagram illustrating a functional configuration of an article identification apparatus 10 of a first example embodiment. As illustrated in FIG. 1, the article identification apparatus 10 includes an article identification information acquisition unit 110, an image acquisition unit 120, a group identification information acquisition unit 130, and an article information acquisition unit 140. The article identification information acquisition unit 110 acquires article identification information of an article. The "article identification information" is information for identifying each article, and may be acquired from, for example, a barcode of the article. However, the article identification information only need to be information for identifying each article, and is not limited to information obtained from a barcode. Here, the article identification information may be managed as information unique within each company or each business category (each of so-called group companies having the same parent company and different brands and/or trade names). In this case, the article identification information is information for identifying an article uniquely within each company or each business category. For this reason, there may be a case where an article cannot be accurately identified by using only article identification information in a place where articles of plural companies or articles of plural business categories are collectively handled. For example, in a case where certain article identification information is assigned to an article of a certain company or a certain business category, the same article identification information as the article identification information may be assigned to a differing article of a differing company or a differing business category. In this case, a single piece of article identification information corresponds to plural articles, and thus an article cannot be uniquely identified. Therefore, the image acquisition unit 120 acquires an image of an attached object which is attached to an article of which article identification information is acquired by the article identification information acquisition unit 110. Here, the "attached object" includes not only an object (for example, a label attached or stuck to an article or a tag tied to an article with a string or the like) which is physically attached to an article but also an object (for example, a service ticket for receiving a service such as a discount or a price reduction on a specific article) which is logically attached to an article. The group identification information acquisition unit 130 processes an image acquired by the image acquisition unit 120 so as to acquire group identification information for identifying a group to which an article belongs. In the present specification, the "group" indicates, for example, a group in a unit of a company having a different parent company from the other groups, or a group in a unit of a company (for each of so-called group companies) having the same parent company and different business categories (brands and/or trade names) from that of the group. The article information acquisition unit 140 acquires article information corresponding to a combination of acquired group identification information and acquired article identification information.

Advantageous Effects

In the present example embodiment, an image of an attached object attached to an article is acquired along with article identification information set for the article. The image of the attached object acquired here includes information (group identification information) for allowing a group to which the article belongs to be identified as will be described later in detail. Article information corresponding to a combination of the acquired article identification information and group identification information acquired as a result of processing the image of the attached object is acquired. Here, as described above, article identification information may be managed as information unique within each company or each business category (each of so-called group companies having the same parent company and different brands and/or trade names). In this case, certain article identification information may indicate plural articles, and thus an article cannot be accurately identified by using only the article identification information. However, according to the present example embodiment, each article can be accurately identified by using a combination of article identification information and group identification information.

Hereinafter, the article identification apparatus 10 of the present example embodiment will be described more in detail.

[Hardware Configuration]

Each functional configuration unit of the article identification apparatus 10 may be realized by hardware (for example, a hard-wired electronic circuit), and may be realized by a combination of hardware and software (for example, a combination of an electronic circuit and a program for controlling the electronic circuit). Hereinafter, a further description will be made of a case where each functional configuration unit of the article identification apparatus 10 is realized by a combination of hardware and software.

Figure 2:
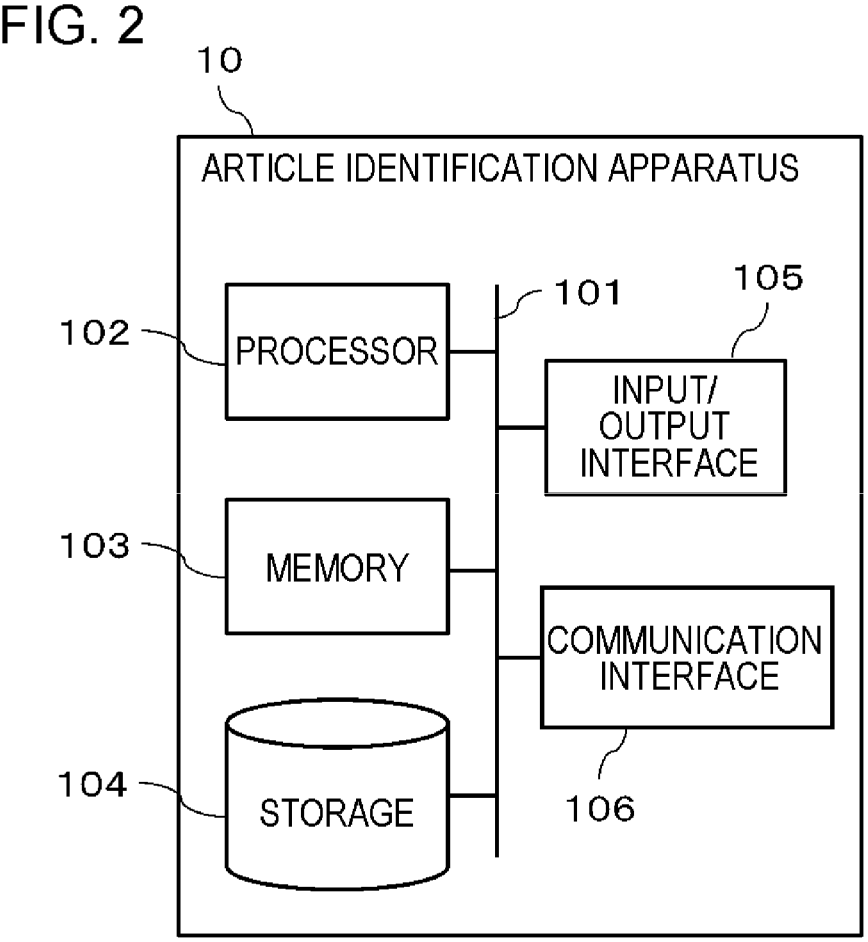
FIG. 2 is a diagram illustrating a hardware configuration of the article identification apparatus.

FIG. 2 is a diagram illustrating a hardware configuration of the article identification apparatus 10. The article identification apparatus 10 includes a bus 101, a processor 102, a memory 103, a storage 104, an input/output interface 105, and a communication interface 106. The bus 101 is a data transmission path for transmitting and receiving data. The processor 102, the memory 103, the storage 104, the input/output interface 105, and the communication interface 106 transmit and receive data to and from each other through the bus 101. However, a method of connecting the processor 102 and the like to each other is not limited to connection using a bus.

The processor 102 is, for example, a calculation processing device such as a central processing unit (CPU) or a graphics processing unit (GPU). The memory 103 is, for example, a random access memory (RAM) or a read only memory (ROM). The storage 104 is, for example, a storage device such as a hard disk drive (HDD), a solid state drive (SSD), or a memory card. The storage 104 may be a memory such as a RAM or a ROM.

The storage 104 stores a program module for realizing a function of each of the processing units (the article identification information acquisition unit 110, the image acquisition unit 120, the group identification information acquisition unit 130, and the article information acquisition unit 140) of the article identification apparatus 10. The processor 102 executes each program module, and thus realizes the function of each processing unit corresponding to the program module. Here, when each program module is executed, the processor 102 may execute the program module after loading the program module into the memory 103, or may execute the program module without loading the program module into the memory 103.

The input/output interface 105 connects the article identification apparatus 10 to input and output devices. For example, the input/output interface 105 is connected to an input device such as a mouse or a keyboard, a display device such as a cathode ray tube (CRT) display or a liquid crystal display (LCD), a touch panel in which an input device and a display device are integrally configured, or the like. Various input and output devices are connected depending on cases where the article identification apparatus 10 is used. For example, the article identification apparatus 10 is assumed to be an apparatus operated by a person engaging in service (checkout service at a cash register, inspection service, stocktaking service) of identifying articles. In this case, the input/output interface 105 of the article identification apparatus 10 is connected to an imaging device configured to include an image sensor such as a complementary metal oxide semiconductor (CMOS) or a charge coupled device (CCD) and a lens. An image of an attached object attached to an article is generated by the imaging device. The imaging device may further generate, for example, an image of a one-dimensional or two-dimensional code symbol printed on or stuck to the article. Here, article identification information may be acquired by analyzing the code symbol in the generated image. In a case where the article identification apparatus 10 is a so-called cash register terminal, the input/output interface 105 is further connected to a handy scanner detecting a code system by using infrared rays, a printer outputting a receipt or the like, a cash drawer, an automatic change dispenser, and the like, in addition to the above-described configuration.

The communication interface 106 is an interface used for the article identification apparatus 10 to be connected to various networks such as the Internet and to perform communication with external apparatuses through the networks. For example, the communication interface 106 connects an external server which receives group identification information and article identification information, and returns article information according to the received information, to the article identification apparatus 10 through a network. For example, the communication interface 106 connects a terminal which has a function of acquiring article identification information of an article and a function of generating an image of an assigned object assigned to the article, to the article identification apparatus 10 through a network. In this case, the article identification apparatus 10 acquires the article identification information and the image of the attached object from the terminal connected thereto through the network.

It should be noted that a hardware configuration of the article identification apparatus 10 is not limited to the configuration illustrated in FIG. 2. For example, each program module may be stored in the memory 103. In this case, the article identification apparatus 10 may not include the storage 104.

First Operation Example

Figure 3:
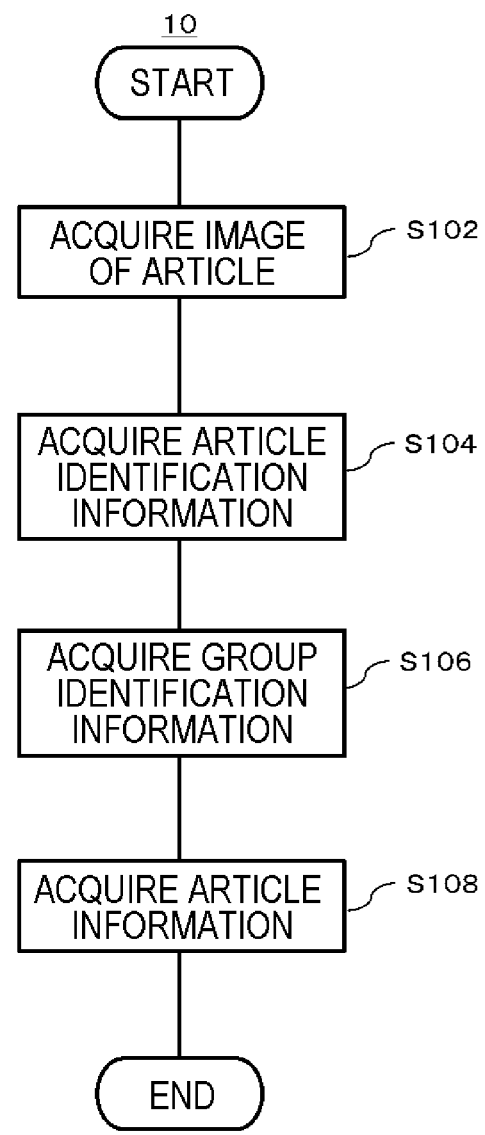
FIG. 3 is a flowchart illustrating a flow of a process in a first operation example of the first example embodiment.

With reference to FIG. 3, a description will be made of a first operation example of the article identification apparatus 10 of the present example embodiment. FIG. 3 is a flowchart illustrating a flow of a process in the first operation example of the first example embodiment. In this operation example, as an example, a description will be made of a case where the article identification apparatus 10 is a so-called point of sales (POS) register apparatus used for article checkout service.

First, the image acquisition unit 120 acquires an image of an article (S102). The image acquired here is an image including at least an attached object attached to the article. The image may further include information which allows the article identification information to be acquired, such as a code symbol obtained by encoding article identification information of the article.

Next, the article identification information acquisition unit 110 acquires article identification information of the article (S104). In a case where information allowing the article identification information to be acquired is included in the image acquired in S102, the article identification information acquisition unit 110 may acquire the article identification information by processing the image. For example, the article identification information acquisition unit 110 may extract from the image acquired in S102 information allowing the article identification information to be acquired by using information as illustrated in FIG. 4.

Figure 4:
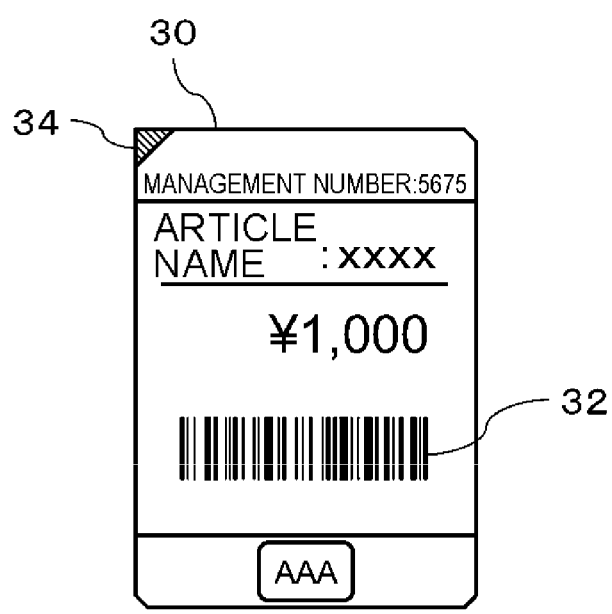
FIG. 4 is a diagram illustrating an example of a storage unit which stores a position of information allowing article identification information to be acquired in an attached object.

FIG. 4 is a diagram illustrating an example of a storage unit which stores a position of information allowing article identification information to be acquired in an attached object 30. However, FIG. 4 illustrates only an example, and a shape of the attached object 30, and a position of information or the number of pieces of information disposed in the attached object 30 are not limited to the example illustrated in FIG. 4. The attached object 30 may have a two-dimensional shape or a three-dimensional shape. As illustrated in FIG. 4, the attached object 30 includes a code symbol 32 and a predetermined reference point 34 (a portion with a mark among four corners of the attached object 30). The storage 104 of the POS register apparatus (article identification apparatus 10) stores information indicating a position where the information included in the attached object is disposed as illustrated in FIG. 4, for example. The position information is relative position information to the predetermined reference point 34 in the image. Note that images of the attached object 30 are often generally acquired substantially with the same size and the same direction. In this case, the storage 104 may store position information of the code symbol 32 as absolute position information. The article identification information acquisition unit 110 identifies the predetermined reference point 34 in the image, and identifies an image region including information (code symbol 32) allowing the article identification information to be acquired by using relative position information to the reference point 34 exemplified in FIG. 4. The article identification information acquisition unit 110 analyzes the code symbol 32 included in the identified image region, and acquires the article identification information encoded in the code symbol 32.

The article identification information acquisition unit 110 is not limited to the above-described example, and may read a code symbol printed or stuck to an article by using a handy scanner (not illustrated) or the like connected to the input/output interface 105, so as to acquire article identification information encoded in the code symbol.

Next, the group identification information acquisition unit 130 processes the image of the attached object acquired in S102 so as to acquire group identification information (S106). For example, the group identification information acquisition unit 130 may acquire group identification information by using a storage unit (FIG. 5, for example) which stores group identification information of each group in association with a feature value which is obtained from an image and which may indicate a specific group.

FIG. 5 is a diagram illustrating an example of a storage unit which stores group identification information of each group in association with a feature value which is obtained from an image and which may indicate a specific group. In the example illustrated in FIG. 5, group identification information is identification information (for example, an identifier (ID) assigned to each company or each business category) specific to each group. An image feature value includes, for example, at least one piece of information of a shape (a two-dimensional shape or a three-dimensional shape), color arrangement, and a pattern of at least a part of the attached object, or a shape (a two-dimensional shape or a three-dimensional shape), color arrangement, and a pattern of a specific design in the attached object. The "specific design" mentioned here indicates, for example, a unique design indicating one company or business category, such as a logo design used on a company basis or a business category basis. Note that the information as illustrated in FIG. 5 is stored in, for example, the storage 104 of the POS register apparatus (article identification apparatus 10).

The Group identification information acquisition unit 130 processes the image acquired in S102, and acquires an image feature value for comparison corresponding to the image feature value stored in the storage 104. The group identification information acquisition unit 130 compares the acquired image feature value for comparison with the image feature value of each group stored in the storage 104. The group identification information acquisition unit 130 acquires group identification information associated with an image feature value which is equal to or greater than a predetermined value and the highest in similarity.

Figure 6:
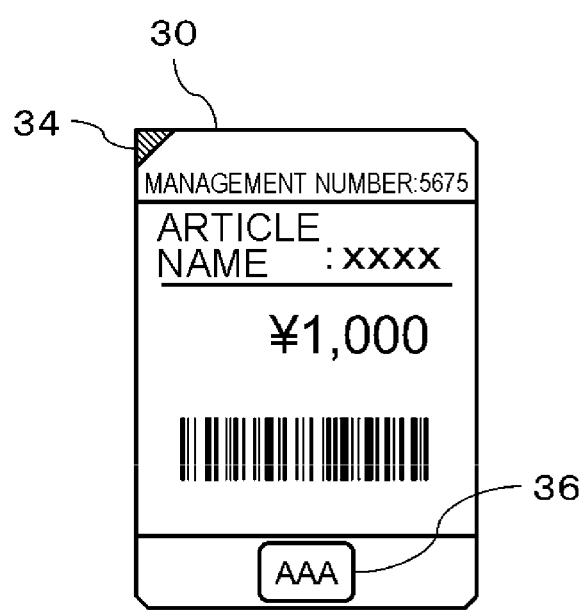
FIG. 6 is a diagram illustrating an example of a storage unit which stores position information of a specific design in an attached object.

Here, the group identification information acquisition unit 130 may identify a specific design from the image of the attached object acquired in S102 by using position information (FIG. 6, for example) of the specific design in the attached object. FIG. 6 is a diagram illustrating an example of a storage unit which stores position information of a specific design in the attached object 30. However, FIG. 6 illustrates only an example, and a shape of the attached object 30, and a position of information or the number of pieces of information disposed in the attached object 30 are not limited to the example illustrated in FIG. 6. As illustrated in FIG. 6, a specific design 36 is often disposed at a predefined position in the attached object 30 attached to an article, such as a tag. Therefore, as exemplified in FIG. 6, the storage 104 of the POS register apparatus (article identification apparatus 10) stores relative position information of the specific design 36 with respect to the predetermined reference point 34. Note that images of the attached object 30 are often generally acquired substantially with the same size and the same direction. In this case, the storage 104 may store position information of the specific design 36 as absolute position information. The group identification information acquisition unit 130 identifies the predetermined reference point 34 in the image, and identifies an image region including the specific design 36 by using relative position information to the reference point 34 exemplified in FIG. 6. The group identification information acquisition unit 130 extracts a feature value of the specific design 36 from the image region, and acquires group identification information through comparison with information as exemplified in FIG. 5.

Next, the article information acquisition unit 140 acquires article information corresponding to a combination of the article identification information acquired in S104 and the group identification information acquired in S106 (S108). The article information acquisition unit 140 may acquire article information corresponding to the combination of the article identification information and the group identification information by using, for example, a storage unit (FIG. 7, for example) which stores article information of each article in association with article identification information and group identification information.

FIG. 7 is a diagram illustrating an example of a storage unit which manages article information of each article in association with article identification information and group identification information. In the example illustrated in FIG. 7, the group identification information is identification information (for example, an identifier (ID) assigned to each company or each business category) specific to each group. The article identification information is, for example, identification information for uniquely identifying an article on a company basis or a business category basis. Thus, as exemplified in FIG. 7, the same article identification information (00001) may be set for different articles of different groups. The article information includes the name and a price of the article, and other information (in a case of checkout service, information regarding a price reduction or a discount) associated with the article. Note that the information as illustrated in FIG. 7 is stored in, for example, the storage 104 of the POS register apparatus (article identification apparatus 10).

The article information acquisition unit 140 uses the article identification information acquired in S104 and the group identification information acquired in S106 as keys, and retrieves and acquires article information corresponding to the information from the information stored in the storage 104.

Here, a storage unit as illustrated in FIGS. 8A and 8B may be used instead of the storage unit as illustrated in FIG. 7. FIGS. 8A and 8B are diagrams illustrating another example of information for managing article information of each article in association with article identification information and group identification information. FIGS. 8A and 8B illustrate an example in which a table is prepared for each group ("group AAA" and "group BBB"), and each article is managed in a state of being associated with article identification information and article information in each table. The article identification information in each table is, for example, identification information for uniquely identifying an article on a company basis or a business category basis. Thus, as exemplified in FIGS. 8A and 8B, the same article identification information (00001) may be set for an article of the table of (A) and an article of the table (B). The article information in each table includes the name and a price of the article, and other information (in a case of checkout service, information regarding a price reduction or a discount) associated with the article. Note that the information as illustrated in FIGS. 8A and 8B is stored in, for example, the storage 104 of the POS register apparatus (article identification apparatus 10).

The article information acquisition unit 140 identifies a table used for retrieval of article information from the storage 104 by using the group identification information acquired in S106. Specifically, the article information acquisition unit 140 identifies a table of a group corresponding to the group identification information acquired in S106 from among the tables on a group basis stored in the storage 104. The article information acquisition unit 140 searches the identified table by using the article identification information acquired in S104 as a key. In the above-described way, the article information acquisition unit 140 acquires the article information corresponding to a combination of the article identification information acquired in S104 and the group identification information acquired in S106 (S108).

Note that, in S106 of this operation example, the information as illustrated in FIG. 5 or 6 may be stored in an external apparatus (for example, a store server, or a center server higher in hierarchy than a store server) which is communicably connected to the POS register apparatus. In this case, the group identification information acquisition unit 130 transmits an image of an attached object attached to an article or a feature value extracted from the image, to the external apparatus, and acquires group identification information which is identified on the basis of the transmitted information on the external apparatus side.

In S108 of this operation example, the information as illustrated in FIG. 7 or FIGS. 8A and 8B may be stored in an external apparatus (for example, a store server, or a center server higher in hierarchy than a store server) which is communicably connected to the POS register apparatus. In this case, the article information acquisition unit 140 transmits the article identification information acquired in S104 and the group identification information acquired in S106 to the external apparatus in association with each other, and acquires article information which is identified on the basis of the transmitted information on the external apparatus side.

Second Operation Example

With reference to FIG. 9, a description will be made of a second operation example of the article identification apparatus 10 of the present example embodiment. FIG. 9 is a sequence diagram illustrating a flow of a process in the second operation example of the first example embodiment. In this operation example, as an example, a description will be made of a case where the article identification apparatus 10 is a server (a store server, or a center server higher in hierarchy than a store server) which performs communication with a POS register apparatus or the like of a store, and performs an article identification process on the basis of information obtained from the POS register apparatus.

First, the POS register apparatus acquires an image of an article (S202). The image acquired here is an image including at least an attached object attached to the article. The image may further include information which allows the article identification information to be acquired, such as a code symbol obtained by encoding article identification information of the article, or text information such as the name or a management number of the article.

The POS register apparatus transmits the acquired image of the article to the server (article identification apparatus 10) (S204). Here, the POS register apparatus may transmit a single image including both of information allowing article identification information to be acquired and an attached object attached to the article, to the server, and may transmit an image including both of information allowing article identification information to be acquired and an image including an attached object attached to the article in a state in which the images have been previously separated to the server. In this case, the separate images are transmitted to the server in a state of being associated with each other with an identification number numbered by the POS register apparatus. Hereinafter, a description will be made of a case where the POS register apparatus transmits a single image including both of information allowing article identification information to be acquired and an attached object attached to the article, to the server.

On the server side, the image acquisition unit 120 acquires the image including information allowing article identification information to be acquired along with the image including the attached object attached to the article. In the same manner as in the process described in the first operation example, the image acquisition unit 120 identifies an image region including the attached object attached to the article.

The article identification information acquisition unit 110 processes the image including information allowing article identification information to be acquired which is received from the POS register apparatus, so as to acquire article identification information from the image (S206). For example, the article identification information acquisition unit 110 processes the image including a code symbol, and acquires the article identification information encoded in the code symbol. In the same manner as in the process described in the first operation example, the article identification information acquisition unit 110 identifies an image region including the information allowing article identification information to be acquired. In the same manner as in the process described in the first operation example, the article identification information acquisition unit 110 analyzes the identified image region so as to acquire article identification information.

Next, the group identification information acquisition unit 130 processes the image of the attached object acquired in S204 so as to acquire group identification information (S208). Specifically, the information as illustrated in FIG. 5 or 6 is stored in the storage 104 of the server (article identification apparatus 10), and the group identification information acquisition unit 130 acquires group identification information from the storage 104 in the same manner as in the process described in the first operation example.

Next, the article information acquisition unit 140 acquires article information corresponding to a combination of the article identification information acquired in S206 and the group identification information acquired in S208 (S210). Specifically, the information as illustrated in FIG. 7 or FIGS. 8A and 8B is stored in the storage 104 of the server (article identification apparatus 10), and the article information acquisition unit 140 acquires article information corresponding to the article identification information and the group identification information from the storage 104 in the same manner as in the process described in the first operation example. In this operation example, the article information acquisition unit 140 transmits the acquired article information to the POS register apparatus (S212). The POS register apparatus displays the article information acquired in S212 on, for example, a display device (not illustrated). Accordingly, a person operating the POS register apparatus can recognize a right article among plural articles having the same article identification information.

Note that, in S204 of this operation example, the POS register apparatus may transmit article identification information which is obtained by analyzing an image including information allowing article identification information to be acquired or obtained by using a handy scanner provided in the POS register apparatus, instead of the image. In this case, the server can acquire the article identification information from the POS register apparatus, and thus may not perform the process in step S206.

Second Example Embodiment

The article identification apparatus 10 of the present example embodiment has the same functional configuration and hardware configuration as those in the first example embodiment except for the following description.

[Functional Configuration and Hardware Configuration]

Figure 10:
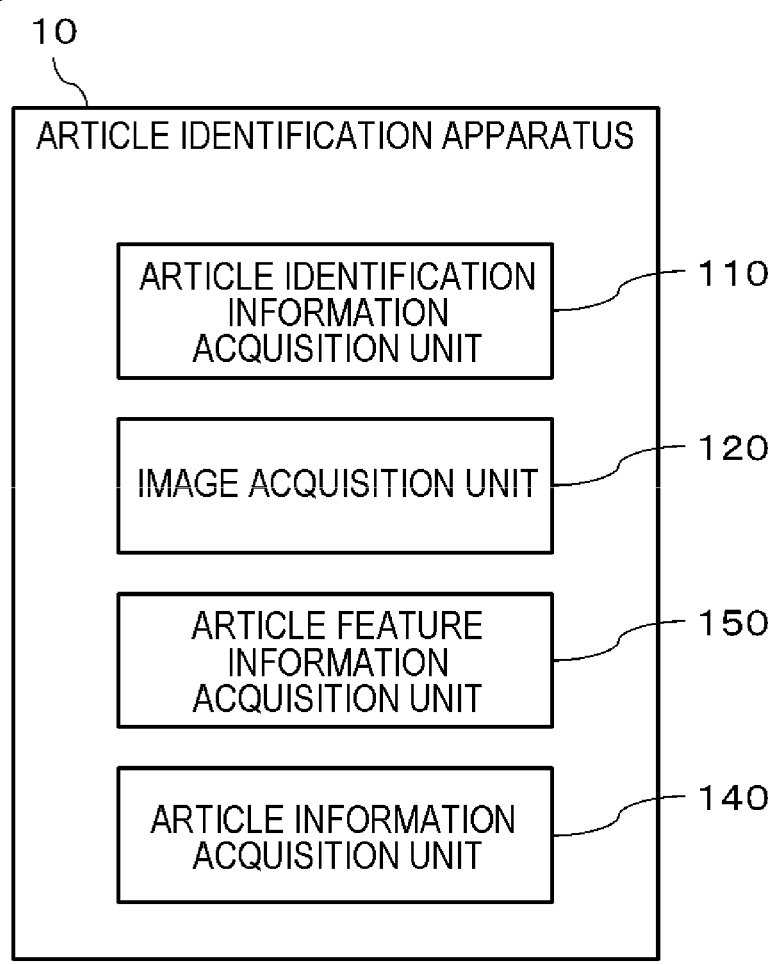
FIG. 10 is a conceptual diagram illustrating a functional configuration of an article identification apparatus according to a second example embodiment.

FIG. 10 is a conceptual diagram illustrating a functional configuration of an article identification apparatus 10 of a second example embodiment. As illustrated in FIG. 10, the article identification apparatus 10 of the present example embodiment includes an article feature information acquisition unit 150 instead of the group identification information acquisition unit 130 provided in the article identification apparatus 10 of the first example embodiment. The article identification apparatus 10 of the present example embodiment stores a program for realizing a function of the article feature information acquisition unit 150 which will be described later in the storage 104. The processor 102 executes a program module so as to further realize the function of the article feature information acquisition unit 150. Hereinafter, differences from the first example embodiment will be focused.

The image acquisition unit 120 of the present example embodiment acquires an image of at least a part of an article. For example, the image acquisition unit 120 acquires an image including a distinctive shape of the article, distinctive color arrangement of the article, a distinctive pattern of the article, or the like in a manner identifiable by image recognition technique. The image acquired here preferably includes many portions of the article from which a feature specific to the article can be extracted.

The article feature information acquisition unit 150 processes the image acquired by the image acquisition unit 120 so as to acquire article feature information indicating an outer feature of the article. Specifically, the article feature information acquisition unit 150 acquires at least one of a shape, color arrangement, and a pattern of at least a part of the article as the article feature information.

First Operation Example

Figure 11:
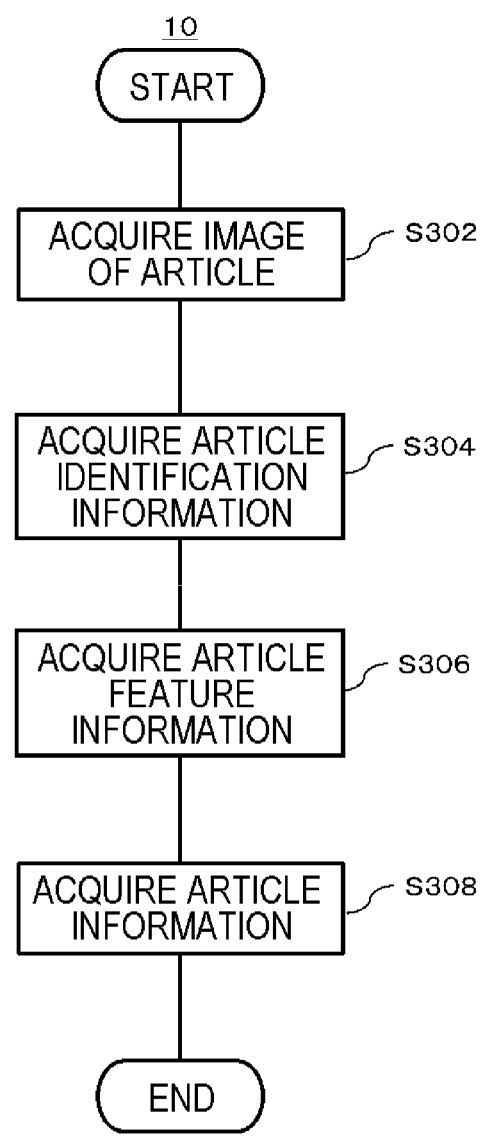
FIG. 11 is a flowchart illustrating a flow of a process in a first operation example of the second example embodiment.

With reference to FIG. 11, a description will be made of a first operation example of the article identification apparatus 10 of the present example embodiment. FIG. 11 is a flowchart illustrating a flow of a process in the first operation example of the second example embodiment. In this operation example, as an example, a description will be made of a case where the article identification apparatus 10 is a so-called point of sales (POS) register apparatus used for article checkout service.

First, the image acquisition unit 120 acquires an image including at least a part of an article (S302). The image acquired here preferably includes many portions of the article from which a feature specific to the article can be extracted. The image may further include information which allows the article identification information to be acquired, such as a code symbol obtained by encoding article identification information of the article.

Next, the article identification information acquisition unit 110 acquires article identification information of the article (S304). The article identification information acquisition unit 110 acquires article identification information as described in the first operation example.

Next, the article feature information acquisition unit 150 processes the image including at least a part of the article acquired in S302, so as to acquire article feature information (S306). The article feature information acquisition unit 150 acquires at least one of a shape, color arrangement, and a pattern of at least a part of the article as the article feature information. Specifically, the article feature information acquisition unit 150 extracts at least one of a feature value indicating a shape of at least a part of the article, a feature value indicating color arrangement of at least a part of the article, and a feature value indicating a pattern of at least a part of the article, from the image.

Next, the article information acquisition unit 140 acquires article information corresponding to a combination of the article identification information acquired in S304 and the article feature information acquired in S306 (S308). The article information acquisition unit 140 may acquire article information corresponding to the combination of the article identification information and the article feature information by using, for example, a storage unit as illustrated in FIG. 12.

FIG. 12 is a diagram illustrating an example of a storage unit which manages article information including outer feature information of each article in association with article identification information. In the example illustrated in FIG. 12, the group identification information is identification information (for example, an identifier (ID) assigned to each company or each business category) specific to each group. The article identification information is, for example, identification information for uniquely identifying an article within each company or each business category. Thus, as exemplified in FIG. 12, the same article identification information (00001) may be set for different articles of different groups. The article information includes the name and a price of the article, outer feature information, and other information (in a case of checkout service, information regarding a price reduction or a discount) associated with the article. The outer feature information is information which is useful for identifying each article and indicates an outer feature specific to the article. Specifically, as illustrated in FIG. 12, information regarding feature values indicating an "elliptical shape (shape)", "blue (color arrangement)", a "striped pattern", and the like is stored in a comparable manner with feature values extracted from the image acquired in S302. Note that the information as illustrated in FIG. 12 is stored in, for example, the storage 104 of the POS register apparatus (article identification apparatus 10).

The article information acquisition unit 140 uses the article identification information acquired in S304 and the article feature information acquired in S306 as keys, and retrieves and acquires article information corresponding to the information from the information stored in the storage 104. For example, the article identification information acquired in S304 is assumed to be "00001". In this case, in the information illustrated in FIG. 12, two articles which are an article with the group identification information "AAA" and an article with the group identification information "BBB" have the article identification information. If article feature information regarding "color arrangement" or a "pattern" can be acquired in S306, it is possible to identify an article indicated by the article identification information "00001" among the two articles. Specifically, if the article feature information acquisition unit 150 can acquire article feature information indicating that the article is one of "blue" or "red", or article feature information indicating that the article has one of a "striped pattern" and "no pattern" in S306, the article information acquisition unit 140 can uniquely identify the article having the article identification information "00001". Then, the article information acquisition unit 140 can acquire the article identification information of the identified article.

Note that, in S308 of this operation example, the information as illustrated in FIG. 12 may be stored in an external apparatus (for example, a store server, or a center server higher in hierarchy than a store server) which is communicably connected to the POS register apparatus. In this case, the article information acquisition unit 140 transmits the article identification information acquired in S304 and the article feature information acquired in S306 to the external apparatus in association with each other, and acquires article information which is identified on the basis of the transmitted information on the external apparatus side.

Second Operation Example

Figure 13:
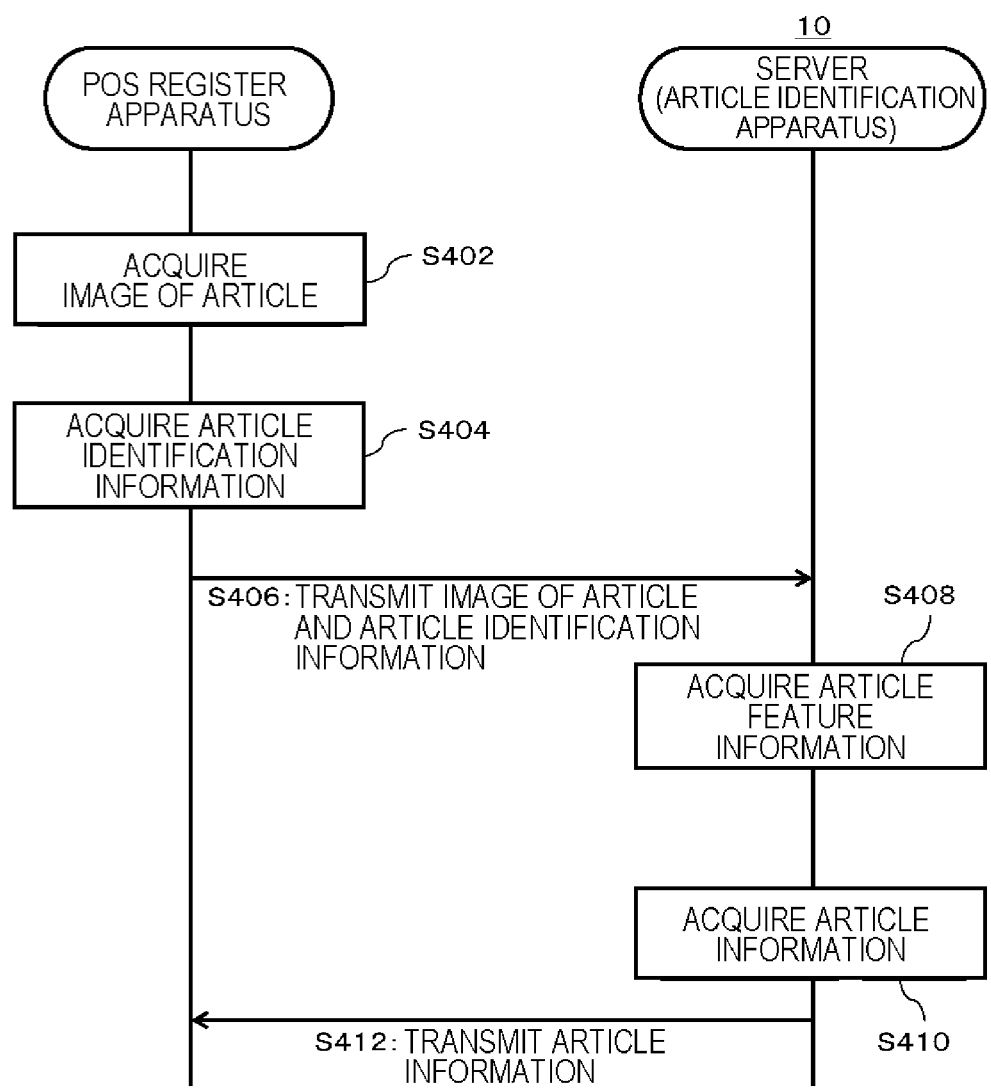
FIG. 13 is a sequence diagram illustrating a flow of a process in a second operation example of the second example embodiment.

With reference to FIG. 13, a description will be made of a second operation example of the article identification apparatus 10 of the present example embodiment. FIG. 13 is a sequence diagram illustrating a flow of a process in the second operation example of the second example embodiment. In this operation example, as an example, a description will be made of a case where the article identification apparatus 10 is a server (a store server, or a center server higher in hierarchy than a store server) which performs communication with a POS register apparatus or the like of a store, and performs an article identification process on the basis of information obtained from the POS register apparatus.

First, the POS register apparatus acquires an image including at least part of an article (S402). The image acquired here preferably includes many portions of the article from which a feature specific to the article can be extracted. The image may further include information which allows the article identification information to be acquired, such as a code symbol obtained by encoding article identification information of the article.

The POS register apparatus performs image analysis on the code symbol of the article or reads the code symbol of the article with a handy scanner so as to acquire article identification information (S404). The POS register apparatus transmits the acquired image of the article and the article identification information in association with each other to the server (article identification apparatus 10) (S406).

The server (article identification apparatus 10) receives the image including at least a part of the article and the article identification information, transmitted from the POS register apparatus in S406. The image acquisition unit 120 acquires the image including at least a part of the article, and the article identification information acquisition unit 110 acquires the article identification information associated with the image.

Next, the article feature information acquisition unit 150 processes the image of the article acquired in S406, so as to acquire article feature information (S408). This is the same as in the first operation example.

Next, the article information acquisition unit 140 acquires article information corresponding to a combination of the article identification information acquired in S406 and the article feature information acquired in S408 (S410). Specifically, the information as illustrated in FIG. 12 is stored in the storage 104 of the server (article identification apparatus 10), and the article information acquisition unit 140 acquires article information corresponding to the article identification information and the article feature information from the storage 104 in the same manner as in the process described in the first operation example. In this operation example, the article information acquisition unit 140 transmits the acquired article information to the POS register apparatus (S412). The POS register apparatus displays the article information acquired in S412 on, for example, a display device (not illustrated). Accordingly, a person operating the POS register apparatus can recognize a right article among plural articles having the same article identification information.

Note that, in this operation example, a description has been made of an example in which the POS register apparatus acquires article identification information, and transmits the article identification information in association with an image of an article, but article identification information may be acquired on the server side. For example, the POS register apparatus may acquire an image of an article further including information (for example, a code symbol) allowing article identification information to be acquired, and may transmit the image of the article to the server side. In this case, the article identification information acquisition unit 110 of the server may analyze the information (for example, a code symbol) allowing article identification information to be acquired, so as to acquire article identification information. In this case, the POS register apparatus may not perform the process in S404.

Advantageous Effects

As mentioned above, in the present example embodiment, article information is identified by using a combination of article identification information and article feature information indicating outer feature of an article. Consequently, even in a case where the same article identification information is set for plural articles, each article can be accurately identified from differences in feature of the respective articles.

Third Example Embodiment

Hereinafter, a description will be made of an article identification system in which the functional units of the article identification apparatus 10 of each example embodiment are distributed to a client terminal and a server.

[System Configuration]

Figure 14:
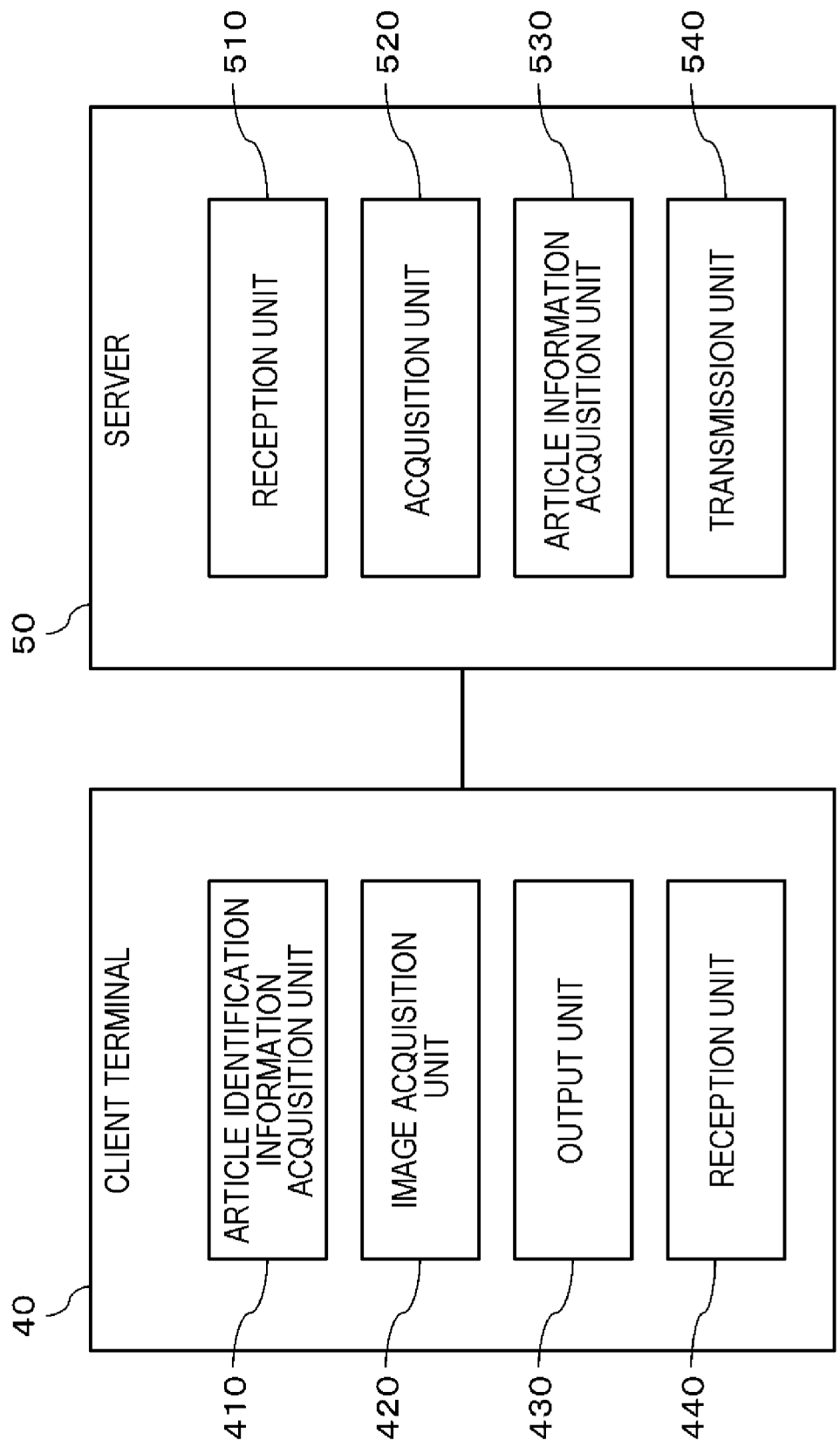
FIG. 14 is a conceptual diagram illustrating a system configuration of an article identification system of a third example embodiment.

FIG. 14 is a conceptual diagram illustrating a system configuration of an article identification system 1 of a third example embodiment. As illustrated in FIG. 14, the article identification system 1 is configured to include a client terminal 40 and a server 50. The server 50 is an apparatus which performs a process of identifying article information corresponding to information received from the client terminal 40, and returns a result thereof to the client terminal 40. The client terminal 40 is a terminal which is used by a person having a chance to actually handle articles in checkout service, inspection service, stocktaking service, and the like. A result of identifying an article is displayed on the client terminal 40, and thus the client terminal 40 may be referred to as an article identification apparatus.

[Functional Configuration of Client Terminal]

The client terminal 40 includes an article identification information acquisition unit 410, an image acquisition unit 420, an output unit 430, and a reception unit 440. The article identification information acquisition unit 410 and the image acquisition unit 420 are the same as the article identification information acquisition unit 110 and the image acquisition unit 120 in each of the example embodiments described above. The article identification information acquisition unit 110 acquires article identification information, and the image acquisition unit 120 acquires an image of an attached object attached to an article or an image of at least a part of the article. The output unit 430 outputs the image acquired by the image acquisition unit 420 and the article identification information acquired by the article identification information acquisition unit 410 to the server 50 performing an article identification process in association with each other. The reception unit 440 receives a process result of the server 50 based on a combination of the image acquired by the image acquisition unit 420 and the article identification information acquired by the article identification information acquisition unit 410.

[Hardware Configuration of Client Terminal]

The client terminal 40 has the same configuration as the hardware configuration of the article identification apparatus 10 illustrated in FIG. 2. Program modules realizing the respective processing units (the article identification information acquisition unit 410, the image acquisition unit 420, the output unit 430, and the reception unit 440) of the client terminal 40 are stored in a storage of the client terminal 40, and a processor of the client terminal 40 executes the program modules so as to realize functions of the client terminal 40 described above. An input/output interface of the client terminal 40 is connected to, for example, an imaging device, an input device, and a display device. The client terminal 40 is connected to a network via a communication interface, and performs communication with the server 50.

[Functional Configuration of Server]

The server 50 includes a reception unit 510, an acquisition unit 520, an article information acquisition unit 530, and a transmission unit 540. The reception unit 510 receives article identification information set for an article, and an image of an attached object attached to the article or an image of at least a part of the article from an external apparatus (client terminal 40). The acquisition unit 520 processes the image received from the client terminal 40 so as to acquire group identification information for identifying a group to which the article belongs or article feature information indicating an outer feature of the article. The article information acquisition unit 530 is the same as the article information acquisition unit 140 of each of the example embodiments described above. The article information acquisition unit 530 acquires article information corresponding to a combination of article identification information received from the client terminal 40 and group identification information or article feature information acquired by the acquisition unit 520. The transmission unit 540 transmits the acquired article information to the external apparatus (client terminal 40).

[Hardware Configuration of Server]

The server 50 has the same configuration as the hardware configuration of the article identification apparatus 10 illustrated in FIG. 2. Program modules realizing the respective processing units (the reception unit 510, the acquisition unit 520, the article information acquisition unit 530, and the transmission unit 540) of the server 50 are stored in a storage of the server 50, and a processor of the server 50 executes the program modules so as to realize functions of the server 50. An input/output interface of the server 50 is connected to, for example, an input device and a display device. The server 50 may not include such devices. The server 50 is connected to a network via a communication interface, and performs communication with the client terminal 40.

Operation Example

Figure 15:
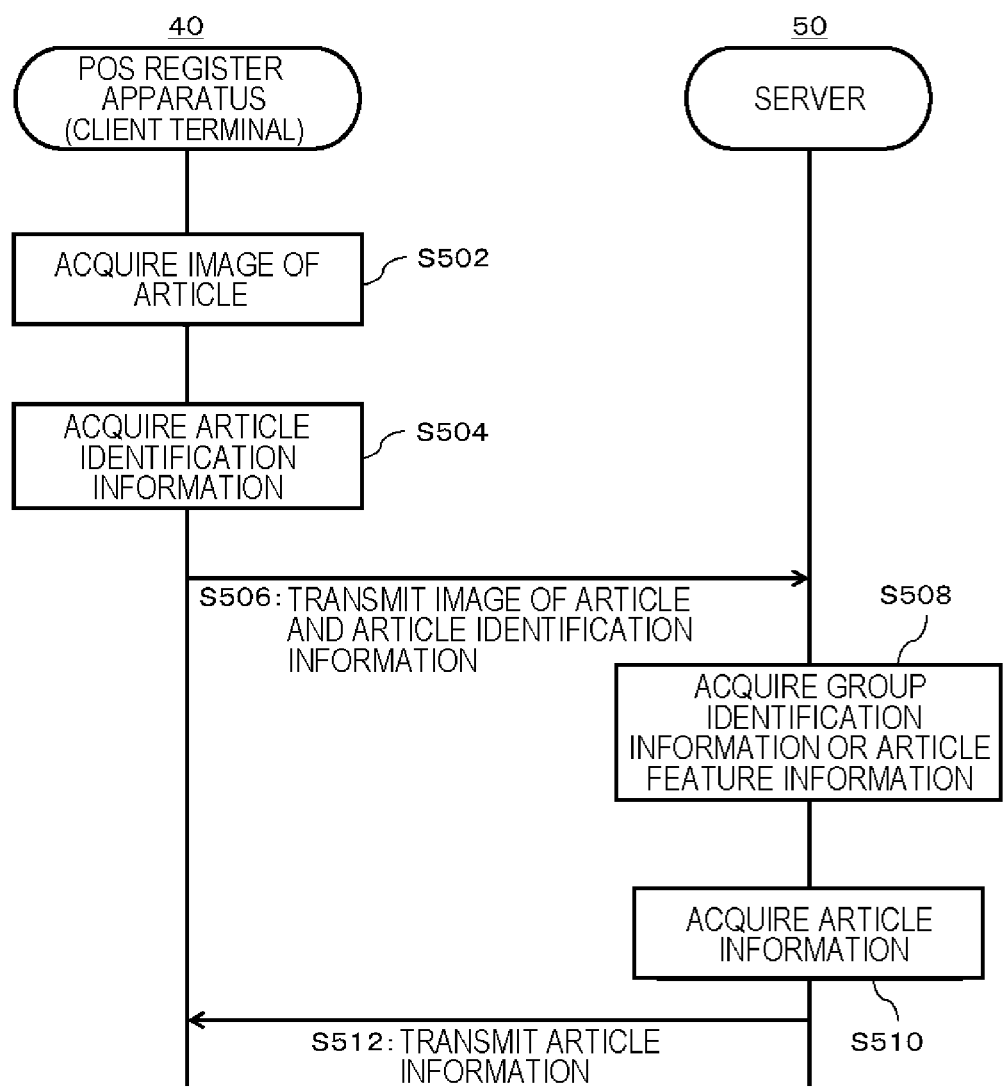
FIG. 15 is a sequence diagram illustrating a flow of a process in the article identification system of the third example embodiment.

With reference to FIG. 15, a description will be made of a flow of a process in the article identification system 1 of the present example embodiment. FIG. 15 is a sequence diagram illustrating a flow of a process in the article identification system 1 of the third example embodiment. In the following description, as an example, a description will be made of a case where the client terminal 40 is a so-called point of sales (POS) register apparatus used for article checkout service, and the server 50 is a store server or a center server higher in hierarchy than a store server which performs an article identification process on the basis of information obtained from the client terminal 40.

First, the image acquisition unit 420 acquires an image including an attached object attached to an article or an image including at least a part of the article (S502). In a case where the image acquired here includes at least a part of the article, the image preferably includes many portions of the article from which a feature specific to the article can be extracted. The image may further include information which allows the article identification information to be acquired, such as a code symbol obtained by encoding article identification information of the article.

The article identification information acquisition unit 410 performs image analysis on the code symbol of the article or reads the code symbol of the article with a handy scanner so as to acquire article identification information (S504). The output unit 430 transmits the acquired image of the article and the article identification information to the server 50 in association with each other (S506).

In the server 50, the reception unit 510 receives the image including the attached object attached to the article or the image including at least a part of the article and the article identification information, transmitted from the POS register apparatus in S506.

Next, the acquisition unit 520 processes the image of the article acquired in S506, so as to acquire group identification information for identifying a group to which the article belongs or article feature information (S508). The acquisition unit 520 switches between the process of acquiring group identification information as described in the first example embodiment and the process of acquiring article feature information as described in the second example embodiment depending on information included in the image acquired from the client terminal 40. This may be realized by the client terminal 40 side setting flag information indicating which of the processes an image included in the acquired image is for, for example, in the process in S506. The server 50 may determine which one of the process in the first example embodiment and the process in the second example embodiment should be performed, by using the flag information set in the client terminal 40.

Next, the article information acquisition unit 530 acquires article information corresponding to a combination of the article identification information acquired in S506 and the group identification information or the article feature information acquired in S508 (S510). This process is as described in each of the example embodiments described above.

Next, the transmission unit 540 transmits the article information acquired in S510 to the client terminal 40 (S512). The client terminal 40 displays the article information acquired in S512 on, for example, a display device (not illustrated). Accordingly, a person operating the POS register apparatus can recognize a right article among plural articles having the same article identification information.

Advantageous Effects

As mentioned above, also in the present example embodiment, it is possible to achieve the same advantageous effect as in each of the example embodiments.

Fourth Example Embodiment

In the above-described example embodiments, there may be a case where, for example, group identification information cannot be acquired from an attached object attached to an article, and thus article information cannot be uniquely identified. Specifically, in a case where an image in which a specific design of an attached object is stained or is hidden by a certain object, or an image which is not clear as a whole is used for a process, there is a possibility that group identification information cannot be accurately acquired from the image. In this case, the article information acquisition unit 140 cannot perform a process of identifying an article. For example, in a case where an image acquired from an image including at least a part of an article is not clear, there is also a possibility that an article cannot be uniquely identified on the basis of a combination of article identification information and an image feature value. Therefore, the article identification apparatus 10 of the present example embodiment further includes a unit solving this problem.

[Functional Configuration and Hardware Configuration]

Figure 16:
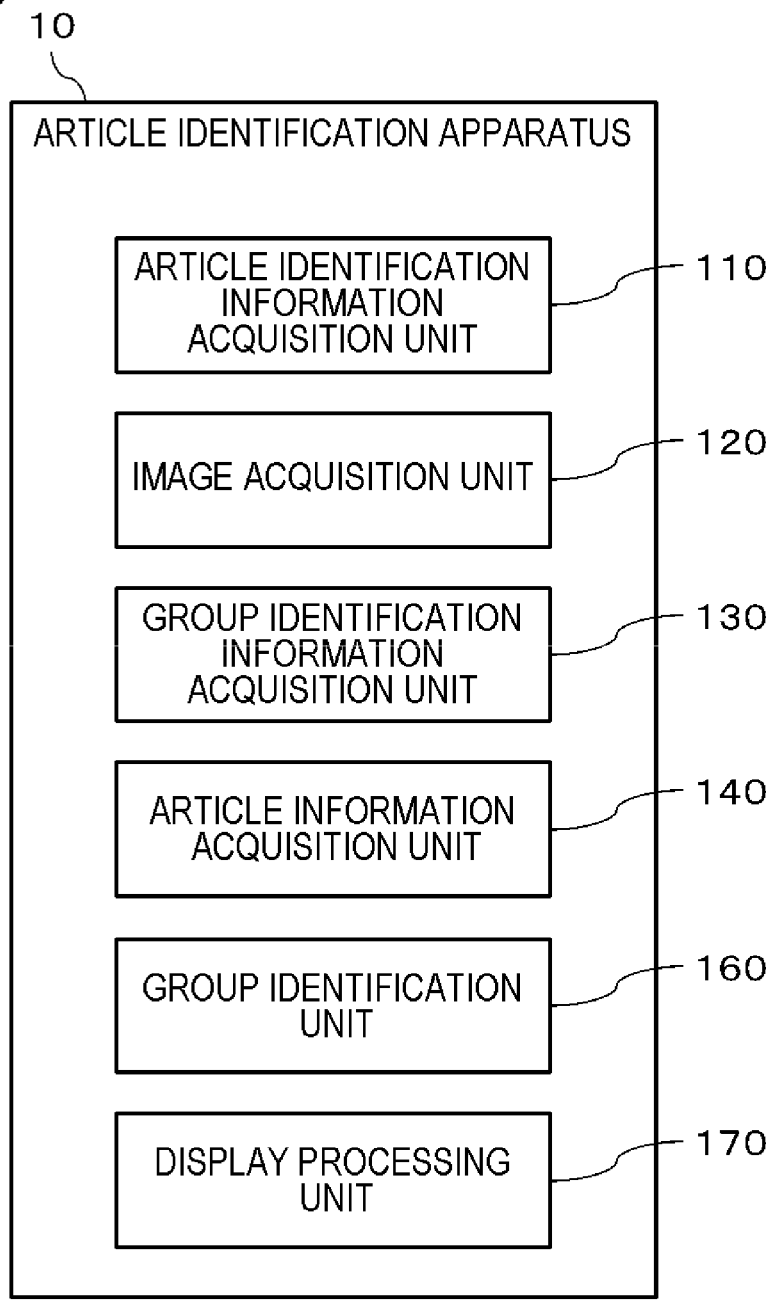
FIG. 16 is a conceptual diagram illustrating a functional configuration of an article identification apparatus of a fourth example embodiment.

FIG. 16 is a conceptual diagram illustrating a functional configuration of an article identification apparatus 10 of a fourth example embodiment. As illustrated in FIG. 16, the article identification apparatus 10 of the present example embodiment includes an article identification information acquisition unit 110, an image acquisition unit 120, a group identification information acquisition unit 130, an article information acquisition unit 140, a group identification unit 160, and a display processing unit 170. The article identification information acquisition unit 110, the image acquisition unit 120, the group identification information acquisition unit 130, and the article information acquisition unit 140 are the same as those of the first example embodiment. In the same manner as in the second example embodiment, the article identification apparatus 10 may include the article feature information acquisition unit 150 instead of the group identification information acquisition unit 130. The article identification apparatus 10 of the present example embodiment stores programs for realizing functions of the group identification unit 160 and the display processing unit 170 which will be described later in the storage 104. The processor 102 executes program modules so as to further realize the functions of the group identification unit 160 and the display processing unit 170. Hereinafter, the additionally provided units of the fourth example embodiment will be focused.

The group identification unit 160 identifies a group in which article information corresponding to article identification information is present. Specifically, the group identification unit 160 identifies article information corresponding to article identification information acquired by the article identification information acquisition unit 110 by using the article identification information acquired by the article identification information acquisition unit 110 and information as illustrated in FIG. 7 or 8. The group identification unit 160 acquires group identification information associated with the article information. Accordingly, a group in which article information corresponding to certain article identification information is present is identified.

In a case where the number of groups identified by the group identification unit 160 is plural, the display processing unit 170 displays a screen for selecting a group to which an article corresponding to article identification information acquired by the article identification information acquisition unit 110 belongs on the display device. The display processing unit 170 can determine whether or not the number of groups identified by the group identification unit 160 is plural on the basis of the number of pieces of group identification information acquired by the group identification unit 160. The display processing unit 170 displays, for example, a screen as illustrated in FIG. 17 on the display device.

Figure 17:
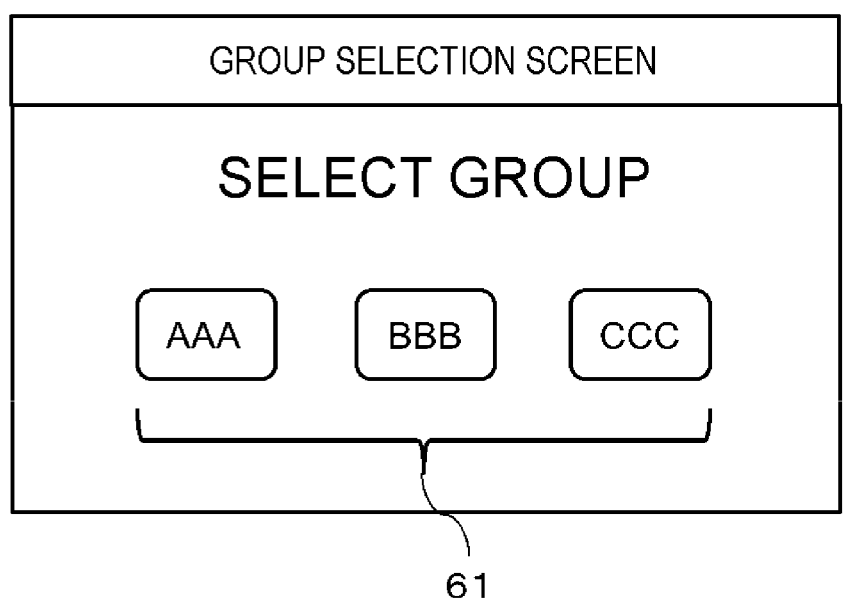
FIG. 17 is a diagram illustrating an example of a screen displayed by a display processing unit of the fourth example embodiment.

FIG. 17 is a diagram illustrating an example of a screen displayed by the display processing unit 170 of the fourth example embodiment. In the example illustrated in FIG. 17, a screen for selecting one group from among groups "AAA", "BBB", and "CCC" is displayed. A group is selected by using screen elements 61 (buttons). A person operating the article identification apparatus 10 selects any one of the screen elements 61 via an input device such as a touch panel. Then, group identification information corresponding to the screen element 61 selected here is delivered to the article information acquisition unit 140. The article information acquisition unit 140 identifies article information by using the group identification information acquired according to the screen input and the article identification information acquired by the article identification information acquisition unit 110.

However, the screen illustrated in FIG. 17 is only an example, and a screen displayed on the display device by the display processing unit 170 is not limited to the example illustrated in FIG. 17. For example, the display processing unit 170 may display a screen in which only a group identified by the group identification unit 160 can be selected among all groups on the display device. For example, it is assumed that article information corresponding to certain article identification information is present in the group "AAA" and the group "BBB", but is not present in the group "CCC". In this case, the group identification unit 160 acquires pieces of group identification information corresponding to the "AAA" and the group "BBB". The display processing unit 170 performs control such that the screen element (button) corresponding to the group "CCC", for example, on the screen in FIG. 17 cannot be pressed by using the group identification information acquired by the group identification unit 160. Alternatively, the display processing unit 170 may generate a screen including a screen element corresponding to the group "AAA" and a screen element corresponding to the group "BBB" and not including a screen element corresponding to the group "CCC", and may display the screen on the display device.

Needless to say, in a case where article information corresponding to article identification information is present in only a single group, it is not necessary to select the group. Therefore, in a case where the number of groups identified by the group identification unit 160 is one, the display processing unit 170 may not display the screen for selecting a group described above on the display device. In this case, the article information acquisition unit 140 may determine that article information corresponding to article identification information acquired by the article identification information acquisition unit 110 is uniquely identified information by using information indicating that the number of groups (the number of pieces of group identification information) identified by the group identification unit 160 is one.

Operation Example

With reference to FIG. 18, a description will be made of an operation example of the article identification apparatus 10 of the present example embodiment. FIG. 18 is a flowchart illustrating a flow of a process in the article identification apparatus 10 of the fourth example embodiment.

First, the article identification apparatus 10 identifies whether or not a first condition for screen display is satisfied (S602). Here, the "first condition for screen display" is, for example, a case where group identification information has not been acquired from an image of an attached object attached to an article in the process in each of the example embodiments described above, or a case where plural pieces of article information have been identified even if article feature information obtained from an image of at least a part of an article is used. Here, in a case where the first condition for screen display is not satisfied (S602: NO), the process in the present example embodiment ends. On the other hand, in a case where the first condition for screen display is satisfied (S602: YES), the group identification unit 160 acquires group identification information of a group in which article information corresponding to article identification information is present on the basis of the article identification information acquired by the article identification information acquisition unit 110 (S604).

Next, the group identification unit 160 identifies whether or not a second condition for screen display is satisfied (S606). Here, the "second condition for screen display" is a case where the number of groups in which article information corresponding to the article identification information is present is plural, that is, two or more pieces of group identification information are acquired in S604. In a case where the second condition for screen display is satisfied (S606: YES), the display processing unit 170 displays a screen (group selection screen) for selecting a group on the display device (S608). Here, the display processing unit 170 may change the content (display or non-display of a button) of the screen on the basis of the group identification information acquired by the group identification unit 160.

Next, the article information acquisition unit 140 receives group selection input through the screen displayed on the display device (S610). The article information acquisition unit 140 uniquely identifies article information by using the article identification information acquired by the article identification information acquisition unit 110 and group identification information acquired according to the input received in S610 (S612).

On the other hand, in a case where the second condition for screen display is not satisfied (S606: NO), the number of pieces of group identification information is one, and article information is uniquely identified. In this case, the display processing unit 170 does not display a group selection screen on the display device, and notifies the article information acquisition unit 140 that the number of pieces of group identification information is one. If the notification is received, the article information acquisition unit 140 acquires article information which can be identified by using only the article identification information acquired by the article identification information acquisition unit 110 as unique information (S612).

Advantageous Effect

As mentioned above, in the present example embodiment, in a case where group identification information cannot be acquired from an image of an attached object or a case where article information cannot be uniquely identified on the basis of article feature information which is obtained from an image including at least a part of an article, a screen for selecting any one group is displayed on the display device. Article information is uniquely identified on the basis of a combination of group identification information corresponding to selection input on the screen and article identification information acquired by the article identification information acquisition unit 110. Accordingly, it is possible to reliably identify article information.

In the present example embodiment, in a case where plural groups are identified by the group identification unit 160, a screen on which only the identified groups can be selected is displayed. Accordingly, it is possible to reduce a probability that a person operating the article identification apparatus 10 may wrongly perform group selection input. In a case where only a single group is identified by the group identification unit 160, a screen for selecting a group is not displayed. Accordingly, an unnecessary operation can be omitted, and it is possible to improve convenience for a person operating the article identification apparatus 10.

As mentioned above, the example embodiments of the present invention have been described with reference to the drawings, but are only examples of the present invention, and various configurations other than the above-described configurations may be employed.

In the plural flowcharts or sequence diagrams used in the above description, plural steps (processes) are sequentially described, but an order of performing the steps in each example embodiment is not limited to the described order. In the above-described example embodiments, an order of the illustrated steps may be changed within the scope without hindering the content thereof. The above-described example embodiments may be combined with each other within the scope without causing a contradiction in the content.

Hereinafter, examples of reference embodiments are added.

1. An article identification apparatus including:
an article identification information acquisition unit that acquires article identification information of an article;
an image acquisition unit that acquires an image of an attached object attached to the article;
a group identification information acquisition unit that acquires group identification information for identifying a group to which the article belongs by processing the image; and
an article information acquisition unit that acquires article information corresponding to a combination of the acquired group identification information and the acquired article identification information.

2. The article identification apparatus according to 1.,
in which article information and article identification information are managed in a state of being associated with each article in a table for each group, and
in which the article information acquisition unit acquires article information corresponding to the acquired article identification information from a table corresponding to the acquired group identification information.

3. The article identification apparatus according to 1. or 2.,
in which the group identification information acquisition unit acquires the group identification information by using at least one of a shape, color arrangement, and a pattern of at least a part of the attached object, and a shape, color arrangement, and a pattern of a specific design in the attached object.

4. The article identification apparatus according to 3.,
in which the group identification information acquisition unit extracts the specific design from the image by using position information of the specific design in the attached object.

5. An article identification apparatus including:
an article information acquisition unit that acquires article identification information of an article;
an image acquisition unit that acquires an image of at least a part of the article;
an article feature information acquisition unit that acquires article feature information indicating an outer feature of the article by processing the image; and
an article information acquisition unit that acquires article information corresponding to a combination of the acquired article feature information and the article identification information of the article.

6. The article identification apparatus according to 5.,
in which the article feature information acquisition unit acquires at least one of a shape, color arrangement, and a pattern of at least a part of the article as the article feature information.

7. An article identification apparatus including:
an article identification information acquisition unit that acquires article identification information of an article;
an image acquisition unit that acquires an image of an attached object attached to the article or an image of at least a part of the article;

an output unit that outputs the acquired image and the acquired article identification information in association with each other to a server performing an article identification process; and a reception unit that receives a process result of the server based on a combination of the acquired image and the acquired article identification information.

8. The article identification apparatus according to any one of 1. to 7., further including:

a group identification unit that identifies a group in which article information corresponding to the article identification information is present; and a display processing unit that displays a screen for selecting a group to which the article corresponding to the acquired article identification information belongs on a display device in a case where the number of identified groups is plural.

9. The article identification apparatus according to 8., in which the display processing unit displays a screen on which, among all groups, only the identified group can be selected on the display device.

10. The article identification apparatus according to 8. or 9., in which, in a case where the number of identified groups is one, the display processing unit does not display a screen for selecting the group on the display device.

11. An article identification method executed by a computer, including:

acquiring article identification information of an article;

acquiring an image of an attached object attached to the article;

acquiring group identification information for identifying a group to which the article belongs by processing the image; and acquiring article information corresponding to a combination of the acquired group identification information and the acquired article identification information.

12. The article identification method according to 11., in which article information and article identification information are managed in a state of being associated with each article in a table for each group, the method further including acquiring article information corresponding to the acquired article identification information from a table corresponding to the acquired group identification information.

13. The article identification method executed by the computer according to 11. or 12., further including acquiring the group identification information by using at least one of a shape, color arrangement, and a pattern of at least a part of the attached object, and a shape, color arrangement, and a pattern of a specific design in the attached object.

14. The article identification method executed by the computer according to 13., further including extracting the specific design from the image by using position information of the specific design in the attached object.

15. An article identification method executed by a computer, including:

acquiring article identification information of an article;

acquiring an image of at least a part of the article;

acquiring article feature information indicating an outer feature of the article by processing the image; and acquiring article information corresponding to a combination of the acquired article feature information and the article identification information of the article.

16. The article identification method executed by the computer according to 15., further including acquiring at least one of a shape, color arrangement, and a pattern of at least a part of the article as the article feature information.

17. An article identification method executed by a computer, including:

acquiring article identification information of an article;

acquiring an image of an attached object attached to the article or an image of at least a part of the article;

outputting the acquired image and the acquired article identification information in association with each other to a server performing an article identification process; and receiving a process result of the server based on a combination of the acquired image and the acquired article identification information.

18. The article identification method executed by the computer according to any one of 11. to 17., further including identifying a group in which article information corresponding to the article identification information is present, and displaying a screen for selecting a group to which the article corresponding to the acquired article identification information belongs on a display device in a case where the number of identified groups is plural.

19. The article identification method executed by the computer according to 18., further including displaying a screen on which, among all groups, only the identified group can be selected on the display device.

20. The article identification method executed by the computer according to 18. or 19., further including not displaying, in a case where the number of identified groups is one, a screen for selecting the group on the display device.

21. A program causing a computer to function as:

an article identification information acquisition unit that acquires article identification information of an article;

an image acquisition unit that acquires an image of an attached object attached to the article;

a group identification information acquisition unit that acquires group identification information for identifying a group to which the article belongs by processing the image; and an article information acquisition unit that acquires article information corresponding to a combination of the acquired group identification information and the acquired article identification information.

22. The program according to 21., in which article information and article identification information are managed in a state of being associated with each article in a table for each group, and in which the computer further functions as a unit that acquires article information corresponding to the acquired article identification information from a table corresponding to the acquired group identification information.

23. The program according to 21. or 22., in which the computer further functions as a unit that acquires the group identification information by using at least one of a shape, color arrangement, and a pattern of at least a part of the attached object, and a shape, color arrangement, and a pattern of a specific design in the attached object.

24. The program according to 23., in which the computer further functions as a unit that extracts the specific design from the image by using position information of the specific design in the attached object.

25. A program causing a computer to function as:
an article information acquisition unit that acquires article identification information of an article;
an image acquisition unit that acquires an image of at least a part of the article;
an article feature information acquisition unit that acquires article feature information indicating an outer feature of the article by processing the image; and
an article information acquisition unit that acquires article information corresponding to a combination of the acquired article feature information and the article identification information of the article.

26. The program according to 25.,
in which the computer further functions as a unit that acquires at least one of a shape, color arrangement, and a pattern of at least a part of the article as the article feature information.

27. A program causing a computer to function as:
an article identification information acquisition unit that acquires article identification information of an article;
an image acquisition unit that acquires an image of an attached object attached to the article or an image of at least a part of the article;
an output unit that outputs the acquired image and the acquired article identification information in association with each other to a server performing an article identification process; and
a reception unit that receives a process result of the server based on a combination of the acquired image and the acquired article identification information.

28. The program according to any one of 21. to 27.,
in which the computer further functions as
a group identification unit that identifies a group in which article information corresponding to the article identification information is present, and
a display processing unit that displays a screen for selecting a group to which the article corresponding to the acquired article identification information belongs on a display device in a case where the number of identified groups is plural.

29. The program according to 28.,
in which the computer further functions as a unit that displays a screen on which, among all groups, only the identified group can be selected on the display device.

30. The program according to 28. or 29.,
in which, in a case where the number of identified groups is one, the computer further functions as a unit that does not display a screen for selecting the group on the display device.

31. A server including:
a reception unit that receives article identification information of an article, and an image of an attached object attached to the article or an image of at least a part of the article from an external apparatus;
an acquisition unit that acquires group identification information for identifying a group to which the article belongs or article feature information indicating an outer feature of the article by processing the received image;
an article information acquisition unit that acquires article information corresponding to a combination of the received article identification information and the acquired group identification information or the acquired article feature information; and
a transmission unit that transmits the acquired article information to the external apparatus.

32. An information processing method of causing a computer to:
receive article identification information of an article, and an image of an attached object attached to the article or an image of at least a part of the article from an external apparatus;
acquires group identification information for identifying a group to which the article belongs or article feature information indicating an outer feature of the article by processing the received image;
acquire article information corresponding to a combination of the received article identification information and the acquired group identification information or the acquired article feature information; and
transmit the acquired article information to the external apparatus.

33. A program causing a computer to function as:
a reception unit that receives article identification information of an article, and an image of an attached object attached to the article or an image of at least a part of the article from an external apparatus;
an acquisition unit that acquires group identification information for identifying a group to which the article belongs or article feature information indicating an outer feature of the article by processing the received image;
an article information acquisition unit that acquires article information corresponding to a combination of the received article identification information and the acquired group identification information or the acquired article feature information; and
a transmission unit that transmits the acquired article information to the external apparatus.

34. An article identification system including:
a client terminal; and
a server that performs an article identification process,
in which the client terminal includes
an article identification information acquisition unit that acquires article identification information of an article,
an image acquisition unit that acquires an image of an attached object attached to the article or an image of at least a part of the article,
an output unit that outputs the acquired image and the acquired article identification information in association with each other to the server, and
a reception unit that receives a process result of the server based on a combination of the acquired image and the acquired article identification information, and
in which the server includes
a reception unit that receives the article identification information and the image of an attached object attached to the article or the image of at least a part of the article, transmitted from the client terminal,
a group identification information acquisition unit that acquires group identification information for identifying a group to which the article belongs or article feature information indicating an outer feature of the article by processing the received image,
an article information acquisition unit that acquires article information corresponding to a combination of the received article identification information and the acquired group identification information or the acquired article feature information, and
a transmission unit that transmits the acquired article information to the client terminal.

This application is based upon and claims the benefit of priority from Japanese Patent Application No. 2015-256422, filed on Dec. 28, 2015; the entire contents of which are incorporated herein by reference.

The invention claimed is:

1. An article identification apparatus comprising:
an article identification information acquisition unit configured to acquire article identification information of an article;
an image acquisition unit configured to acquire an image of an attached object attached to the article;
a group identification information acquisition unit configured to acquire group identification information for identifying a group to which the article belongs by processing the image;
a group identifying unit configured to identify a group in which article information corresponding to the article identification information is present if no group identification information is acquired based on the image;
a display processing unit configured to display, on a display device, a screen for selecting a group to which the article belongs if the number of identified groups is plural; and
an article information acquisition unit configured to acquire article information corresponding to a combination of the acquired group identification information or group identification information of the group selected on the screen and the acquired article identification information.

2. The article identification apparatus according to claim 1,
wherein the article identification apparatus is configured to manage article information and article identification information in a state of being associated with each article in a table for each group, and
wherein the article information acquisition unit is configured to acquire article information corresponding to the acquired article identification information from a table corresponding to the acquired group identification information.

3. The article identification apparatus according to claim 1, wherein the group identification information acquisition unit is configured to acquire the group identification information by using at least one of a shape, color arrangement, and a pattern of at least a part of the attached object, and a shape, color arrangement, and a pattern of a specific design in the attached object.

4. The article identification apparatus according to claim 3, wherein the group identification information acquisition unit is configured to extract the specific design from the image by using position information of the specific design in the attached object.

5. The article identification apparatus according to claim 1, wherein the display processing unit is configured to display a screen on which, among all groups, only the identified group can be selected on the display device.

6. The article identification apparatus according to claim 1, wherein the display processing unit is configured to, in a case where the number of identified groups is one, not display a screen for selecting the group on the display device.

7. An article identification apparatus comprising:
an article information acquisition unit configured to acquire article identification information of an article;
an image acquisition unit configured to acquire an image of at least a part of the article;
an article feature information acquisition unit configured to acquire article feature information indicating an outer feature of the article by processing the image;
a group identifying unit configured to identify a group in which article information corresponding to the article identification information is present if a plurality of pieces of article information are acquired based on the article feature information;
a display processing unit configured to display, on a display device, a screen for selecting a group to which the article belongs if the number of identified groups is plural; and
an article information acquisition unit configured to acquire article information corresponding to a combination of the acquired article feature information or group identification information of the group selected on the screen and article identification information of the article.

8. The article identification apparatus according to claim 7, wherein the article feature information acquisition unit configured to acquire at least one of a shape, color arrangement, and a pattern of at least a part of the article as the article feature information.

9. An article identification apparatus comprising:
an article identification information acquisition unit configured to acquire article identification information of an article;
an image acquisition unit configured to acquire an image of an attached object attached to the article or an image of at least a part of the article;
an output unit configured to output the acquired image and the acquired article identification information in association with each other to a server performing an article identification process;
a display processing unit configured to display, on a display device, a screen for selecting a group to which the article belongs in response to a first process result of the server and to send selection result information indicating a group selected on the screen to the server; and
a reception unit configured to receive a second process result of the server, the second processing result being based on a combination of the acquired image or the selection result information and the acquired article identification information.

10. An article identification method executable by a computer, the method comprising:
acquiring article identification information of an article;
acquiring an image of an attached object attached to the article;
acquiring group identification information for identifying a group to which the article belongs by processing the image;
if no group identification information is acquired based on the image:
identifying a group in which article information corresponding to the article identification information is present; and
displaying on a display device, a screen for selecting a group to which the article belongs if the number of identified groups is plural; and
acquiring article information corresponding to a combination of the acquired group identification information or group identification information of the group selected on the screen and the acquired article identification information.

11. A non-transitory computer readable medium storing a program that, if executed, causes a computer to function as:
an article identification information acquisition unit that acquires article identification information of an article;

an image acquisition unit that acquires an image of an attached object attached to the article;

a group identification information acquisition unit that acquires group identification information for identifying a group to which the article belongs by processing the image;

a group identifying unit configured to identify a group in which article information corresponding to the article identification information is present if no group identification information is acquired based on the image;

a display processing unit configured to display, on a display device, a screen for selecting a group to which the article belongs if the number of identified groups is plural; and an article information acquisition unit that acquires article information corresponding to a combination of the acquired group identification information or group identification information of the group selected on the screen and the acquired article identification information.

12. A server comprising:

a reception unit configured to receive article identification information of an article, and an image of an attached object attached to the article or an image of at least a part of the article from an external apparatus;

a group identifying unit configured to identify a group in which article information corresponding to the article identification information is present if no group identification information is acquired based on the image or if a plurality of pieces of article information are acquired based on the article feature information;

a display processing unit configured to display, on a display device, a screen for selecting a group to which the article belongs if the number of identified groups is plural;

an acquisition unit configured to acquire group identification information for identifying a group to which the article belongs or article feature information indicating an outer feature of the article by processing the received image;

an article information acquisition unit configured to acquire article information corresponding to a combination of the received article identification information and one of the acquired group identification information, the acquired article feature information and group identification information of the group selected on the screen; and a transmission unit configured to transmit the acquired article information to the external apparatus.

13. An article identification system comprising:

a client terminal; and a server configured to perform an article identification process, wherein the client terminal includes:

an article identification information acquisition unit configured to acquire article identification information of an article;

an image acquisition unit configured to acquire an image of an attached object attached to the article or an image of at least a part of the article;

an output unit configured to output the acquired image and the acquired article identification information in association with each other to the server, a display processing unit configured to display, on a display device, a screen for selecting a group to which the article belongs in response to a first process result of the server and to send selection result information indicating a group selected on the screen to the server; and a reception unit configured to receive a second process result of the server, the second process result being based on a combination of the acquired image or the selection result information and the acquired article identification information, and wherein the server includes:

a reception unit configured to receive the article identification information and the image of an attached object attached to the article or the image of at least a part of the article, transmitted from the client terminal;

a group identification information acquisition unit configured to acquire group identification information for identifying a group to which the article belongs or article feature information indicating an outer feature of the article by processing the received image;

a group identifying unit configured to identify a group in which article information corresponding to the article identification information is present if no group identification information is acquired based on the image or if a plurality of pieces of article information are acquired based on the article feature information;

a display processing unit configured to send the first process result to the client terminal if the number of identified groups is plural;

an article information acquisition unit configured to acquire article information corresponding to a combination of the received article identification information and one of the acquired group identification information, the acquired article feature information and group identification information of the group selected on the screen; and a transmission unit configured to transmit the acquired article information to the client terminal.

* * * * *

UNITED STATES PATENT AND TRADEMARK OFFICE
CERTIFICATE OF CORRECTION

PATENT NO. : 10,726,215 B2
APPLICATION NO. : 16/062252
DATED : July 28, 2020
INVENTOR(S) : Hisayuki Mizuguchi et al.

Page 1 of 1

It is certified that error appears in the above-identified patent and that said Letters Patent is hereby corrected as shown below:

On the Title Page

Column 1, (71) Applicants, Line 1; Delete "Applicants: NEC CORPORATION, Tokyo (JP);" and insert --Applicant:-- therefor Column 1, (71) Applicants, Line 2; Delete "Tokyo" and insert --Kawasaki-shi, Kanagawa-- therefor In the Claims Column 30, Line 10; In Claim 13, delete "server," and insert --server;-- therefor Signed and Sealed this
First Day of December, 2020

Andrei Iancu
*Director of the United States Patent and Trademark Office*